(12) United States Patent
Cai

(10) Patent No.: US 11,156,424 B1
(45) Date of Patent: Oct. 26, 2021

(54) IMITATIONAL LASER-SHOOTING SIMULATED GUN AND VIRTUAL REALITY SYSTEM

(71) Applicant: SHENZHEN INDESIGN TECHNOLOGY LTD., Shenzhen (CN)

(72) Inventor: Hongfa Cai, Shenzhen (CN)

(73) Assignee: SHENZHEN INDESIGN TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 17/030,640

(22) Filed: Sep. 24, 2020

(51) Int. Cl.
*F41A 33/02* (2006.01)
*G06T 19/00* (2011.01)
*F41G 3/26* (2006.01)

(52) U.S. Cl.
CPC ............ *F41A 33/02* (2013.01); *F41G 3/2622* (2013.01); *G06T 19/006* (2013.01)

(58) Field of Classification Search
CPC .......... F41A 33/00; F41A 33/02; F41A 33/04; F41A 33/06; F41G 3/26; F41G 3/2622; G06T 19/00; G06T 19/006; F41B 11/00; F41B 11/89
See application file for complete search history.

(56) References Cited

U.S. PATENT DOCUMENTS

| | | | |
|---|---|---|---|
| 2015/0308783 A1* | 10/2015 | Lee | F41A 33/06 124/71 |
| 2017/0176132 A1* | 6/2017 | Kang | F41B 11/89 |
| 2019/0093977 A1* | 3/2019 | Kim | A63H 29/22 |

* cited by examiner

*Primary Examiner* — Timothy A Musselman
(74) *Attorney, Agent, or Firm* — Westbridge IP LLC

(57) ABSTRACT

Disclosed is an imitational laser-shooting simulated gun including a handle module, a gear box module and a sliding shell module. The handle module includes a housing, an outer cover and a trigger. The housing is covered by the outer cover and defines an installation groove which is set open. The trigger is rotatably set on the housing and exposed out of the outer cover. The trigger is to generate a triggering signal for shooting. The gear box module includes a motor and a gear set disposed in the installation groove and driven by the motor. The sliding shell module is slideably connected with the outer cover, covering the installation groove and engagingly connected with the gear set. The gear box module drives the sliding shell module to reciprocate on the housing according to the triggering signal to generate a recoil. A related virtual reality system is also provided.

20 Claims, 18 Drawing Sheets

IMITATIONAL LASER-SHOOTING SIMULATED GUN AND VIRTUAL REALITY SYSTEM

FIELD

The present disclosure relates to the technical field of virtual reality technology, in particular to an imitational laser-shooting simulated gun and a virtual reality system applying the imitational laser-shooting simulated gun.

BACKGROUND

The functions of the current shooting-training simulated guns are relatively simple, most of which are static models without a sense of recoil, not being able to simulate the status of an empty chamber on-hook and to monitor the bullet amounts of the chamber. From the training perspective, it could merely train the basic gestures such as pulling out a gun and holding a gun, incapable of having a realistic gun shooting training, and simulating real gun operations and status.

SUMMARY

The main purpose of the present disclosure is to disclose an imitational laser-shooting simulated gun that is aiming to simulate a sense of recoil of a gun, optimizing the realistic feeling of using the imitational gun.

To pursue the purpose above, the present disclosure discloses an imitational laser-shooting simulated gun including:

a handle module including a housing, an outer cover and a trigger, wherein the housing is configured with an installation groove, the outer cover covers the housing, the installation groove is set open, and the trigger is rotatably set on the housing and is exposed out of the outer cover, the trigger is configured to generate a triggering signal for shooting;

a gear box module including an motor and a gear set disposed in the installation groove, where the motor is connected with the gear set; and a sliding shell module slideably connected with the outer cover, covering the installation groove, and engagingly connected with the gear set;

where, the gear box module is configured to drive the sliding shell module to reciprocate on the housing according to the triggering signal, in order to generate a recoil.

In some embodiments, the gear box module further includes a magnetic member disposed on the gear set; the handle module further includes a Hall sensor, the Hall sensor is disposed on a side of the outer cover facing the housing, the Hall sensor is disposed corresponding to the gear set, electrically connected to the motor and configured to sense the magnetic member to adjust a rotation of the motor.

In some embodiments, the gear set includes a primary gear, a crown gear, a secondary gear and a tertiary gear, an output shaft of the motor is engagingly connected with the crown gear through the primary gear, the crown gear, the secondary gear and the tertiary gear are rotatably configured in the installation groove, the crown gear, the secondary gear and the tertiary gear are sequentially engaged, and the tertiary gear is engagingly connected with the sliding shell module; the magnetic member is disposed on the tertiary gear and is located at a centrifugal position of the tertiary gear; the motor is configured to rotate the primary gear, the crown gear, the secondary gear and the tertiary gear, thereby to drive the sliding shell to reciprocate along a length direction of the outer cover.

In some embodiments, a periphery of the tertiary gear is configured with a first tooth section and a second tooth section, the first tooth section and the second tooth section are sequentially connected with each other and surround the periphery of the tertiary gear, the tertiary gear further defines a space-avoiding area corresponding to the first tooth section, the space-avoiding area is located side-by-side with the first tooth section; the first tooth section and the second tooth section are engagingly connected with the sliding shell module, the second tooth section is further engagingly connected with the secondary gear, and the space-avoiding area is corresponding to the secondary gear.

In some embodiments, the housing includes a front end and a rear end along a length direction of the housing; the handle module further includes: a sensing assembly configured on the rear end of the housing and electrically connected with the gear box module; and a transmission assembly, and a transmission assembly configured inside the installation groove, and spaced from the gear box module, and connected with the trigger; where, the trigger is further configured to swing to drive the transmission assembly to approach or be away from the sensing assembly, thereby to drive the sensing assembly to generate the triggering signal for shooting.

In some embodiments, the transmission assembly includes a transmission component, a floating shifting component, a hammer lock, and a hammer, movably configured in the installation groove, an end of the transmission assembly is connected with the trigger, and another end of the transmission assembly abuts against the floating shifting component, the floating shifting component abuts against the hammer lock, the hammer lock abuts against the limited position of a periphery of the hammer, the hammer is located on the rear end of the housing; the handle module further includes a tension spring, an end of the tension spring is connected with the hammer, another end of the tension spring is connected with the rear end of the housing, the tension spring is configured to apply a force on the hammer towards the sensing assembly; the trigger is configured to swing to drive the transmission component to move, the movement of the transmission component drives the floating shifting component to move, the movement of the floating shifting component drives the hammer lock to rotate, thereby force on the hammer applied by the hammer lock is canceled.

In some embodiments, the transmission assembly further includes a floating elastic piece and a hammer locking elastic piece, both connected with an inner surface of the installation groove; the floating elastic piece abuts against the floating shifting component, and is configured to apply a force on the floating shifting component towards the transmission component; the hammer elastic piece abuts against the hammer lock, and is configured to apply a force on a periphery of the hammer lock towards the hammer.

In some embodiments, a triggering piece is configured on a side of the hammer facing the sensing assembly; the sensing assembly is an photoelectric switch.

In some embodiments, the housing includes a front end and a rear end along a length direction of the housing; the imitational laser-shooting simulated gun further includes a blocking module configured on the front end of the housing; the blocking module including: a front rail frame configured at the front end of the housing; and a reciprocating spring reverse pin configured on a side of the front rail frame away from the housing, the reciprocating spring reverse pin abuts against the front rail frame through a reciprocating spring, an end of the reciprocating spring reverse pin that is away from the reciprocating spring abuts against the sliding shell module.

The outer cover is partially covering the blocking module, the sliding shell module is slidable connected to the front rail frame, the sliding shell module defines a reciprocating spring reverse pin hole corresponding to the reciprocating spring reverse pin, a periphery of the reciprocating spring reverse pin hole abuts against the reciprocating spring reverse pin, the reciprocating spring reverse pin and the reciprocating spring are configured to cooperate to apply a force to the sliding shell module towards the front end.

In some embodiments, the sliding shell module further defines a gun hole spaced from the reciprocating spring reverse pin; the blocking module further includes a gun barrel, the gun barrel is disposed on a side of the front rail frame away from the housing, the gun barrel is set side-by-side with the reciprocating spring reverse pin, and is set passing the gun hole.

In some embodiments, the front rail frame includes: a frame body connected with the housing, an end of the frame body closer to the housing defining a plug-in hole and a spring groove communicating with the plug-in hole; a blocking panel received in the plug-in hole, a side surface of the blocking panel being convexly formed with a pressure spring blocking sheet corresponding to the spring groove; a spring set in the spring groove, an end of the spring abutting against the bottom surface of the spring groove, another end of the spring abutting against the pressure spring blocking sheet, to urge the blocking panel to partially extrude out of the plug-in hole, the blocking panel abutting against the sliding shell module; and a blocking-and-compressing component fixedly connected to an end of the blocking panel which is out of the plug-in hole, thereby to position the blocking panel at the plug-in hole. The sliding module is slidably connected with the frame body.

In some embodiments, a surface of the blocking panel away from the gun barrel is convexly formed with an anti-disassembling buckle; the sliding shell module is formed with an anti-tripping buckle corresponding to the anti-disassembling buckle, the anti-tripping buckle abutting against the anti-disassembling buckle.

In some embodiments, the imitational laser-shooting simulated gun further includes a laser module set in the handle module or in the gun barrel, a laser emitting terminal of the laser module being set corresponding to the gun hole.

In some embodiments, the sliding shell module includes: a sliding shell component defining a containing groove, the reciprocating spring reverse pin hole and the gun hole that are communicating with the containing groove; and a transmission rack set on a bottom wall of the containing groove; where, the sliding shell component is connected with the handle module, and the transmission rack is engagingly connected with the gear set.

In some embodiments, a front sight and a rear sight are set on an outer surface of the sliding shell component, and the front sight and the rear sight are respectively set on a front end and a rear end of the sliding shell component.

In some embodiments, the imitational laser-shooting simulated gun further includes a charger module, the charger module including a charger shell and a battery set in the charger shell, the charger shell being partially inserted in the outer cover, and removably connected with the outer cover, the battery being electrically connected with the gear box module.

In some embodiments, the charger module further includes a driving circuit board electrically connected with the battery and the gear box module, the driving circuit board is configured with multiple LED lamps, the LED lamps are set to simulate a number of virtual bullets.

In some embodiments, the charger module further includes a steering engine set on a side of the charger shell closer to the handle module and electrically connected with the driving circuit board; the sliding module defines an on-hook clamping groove close to the housing; the handle module further includes a sliding shell lock, a transmission steel wire and a steel wire jacking block that are rotatably set in the housing, an end of the transmission steel wire is connected with the sliding shell lock, and another end of the transmission steel wire is connected with the steel wire jacking block, the steel wire jacking block directly faces the steering engine; the steering engine is configured to drive the steel wire jacking block to rotate the transmission steel wire and the sliding shell lock, thereby to make the sliding shell lock get closer to the sliding shell module, and be limitedly positioned in the on-hook clamping groove.

In some embodiments, the outer cover is configured with two plug-in holes communicating with the installation groove, the two plug-in holes are set facing each other. The handle module further includes a charger lock, a charger swing buckle and a swing buckle torsional spring, the charger lock is set to run through the two plug-in holes, the charger lock is configured with a chute, the charger swing buckle is set on an inner surface of the outer cover through the swing buckle torsional spring, an end of the charger swing buckle is configured with a swing button slidably set in the chute, and another end of the charger swing buckle is configured with a clamping buckle; the charger shell is configured with a charger buckle opening corresponding to the clamping buckle; the charger shell is configured with a charger buckle opening corresponding to the clamping buckle.

The present disclosure also discloses a virtual reality system, the virtual reality system includes: a terminal device; and the imitational laser-shooting simulated gun above, the terminal device communicating connected with the imitational laser-shooting simulated gun.

In the present disclosure, through that a gear box is set into a housing, a sliding shell module is slidably set on an outer cover and covers an opening of an installation groove, the sliding shell module and the gear box module are engagingly connected with each other. Meanwhile, a trigger is set on the housing. Users pull the trigger to generate a triggering signal for shooting, thereby to drive the gear box to operate. The gear box drives the sliding shell module move forward and backward relatively to the housing, simulating a sense of recoil of a gun shooting. The imitational laser-shooting simulated gun of the present disclosure simulates a sense of recoil of a gun shooting, and optimizes the extent of emulation.

BRIEF DESCRIPTION OF THE DRAWINGS

To more clearly illustrate technical solutions in the embodiments or exemplary structures of the present disclosure, the following will briefly introduce the drawings that need to be used in the description of the embodiments or exemplary structures. Obviously, the drawings in the following description are only some embodiments of this disclosure. For those of ordinary skill in the art, without creative effort, other drawings can be obtained according to the structures shown in these drawings.

DETAILED DESCRIPTION OF THE EMBODIMENTS

The technical solutions in the embodiments of the present disclosure will be clearly and completely described in conjunction with the drawings in the embodiments of the present disclosure, and obviously, the described embodiments are merely a part of the embodiments of the present disclosure and not all embodiments. Based on the embodiments in the present disclosure, all other embodiments obtained by one of ordinary skills in the art without creative efforts are within the scope of the present disclosure.

It should be noted that, if the embodiments of the present disclosure relate to directional indications such as upper, lower, left, right, front, rear, etc. The directional indications are set only to account for relative positional relationships, motion conditions, etc. between the components in a particular pose (as shown in the figures), and if the particular pose changes, the directional indications change accordingly.

In addition, if "first", "second" and the like in the embodiments of the present disclosure is described, the description of the "first", "second" and the like is only provided for the purpose of description and is not to be construed as indicating or implying the relative importance or implicitly indicating the number of technical features indicated. Thus, a feature defined with "first", "second" may explicitly or implicitly include at least one of the features. In addition, the meaning of "and/or" appearing throughout is including three paratactic solutions, taking "A and/or B" as an example, it includes A solution, or B solution, or A solution and B solution are simultaneously satisfied. In addition, the technical solutions between the various embodiments can be combined with each other, but must be based on the ability of one of ordinary skills in the art. When the combination of the technical solutions is contradictory or cannot be realized, the combination of the technical solutions should not be considered to exist and are not within the scope of protection of the present disclosure.

Figure 1:
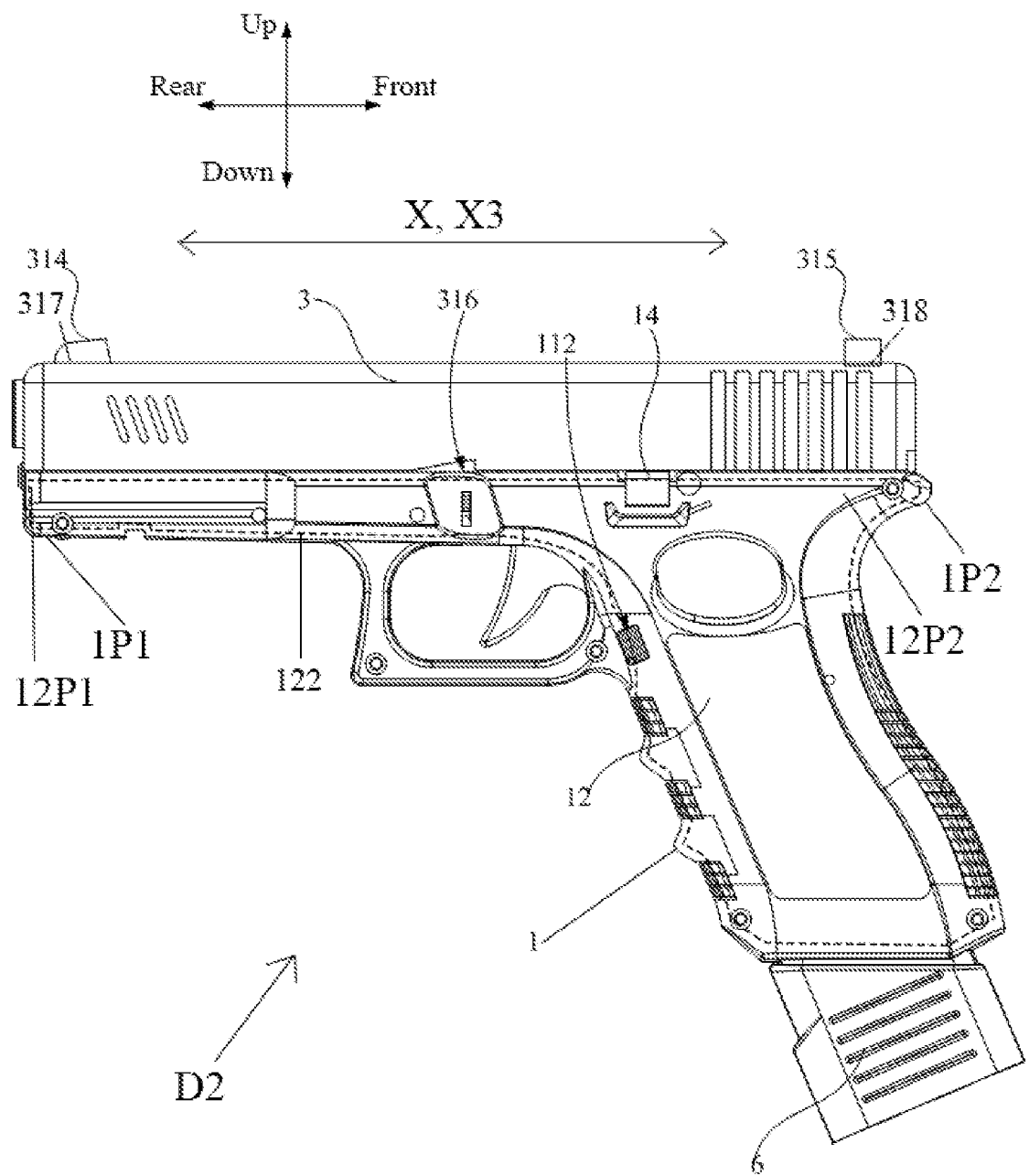
FIG. 1 is a structural schematic view of an embodiment of an imitational laser-shooting simulated gun of the present disclosure.
Figure 2:
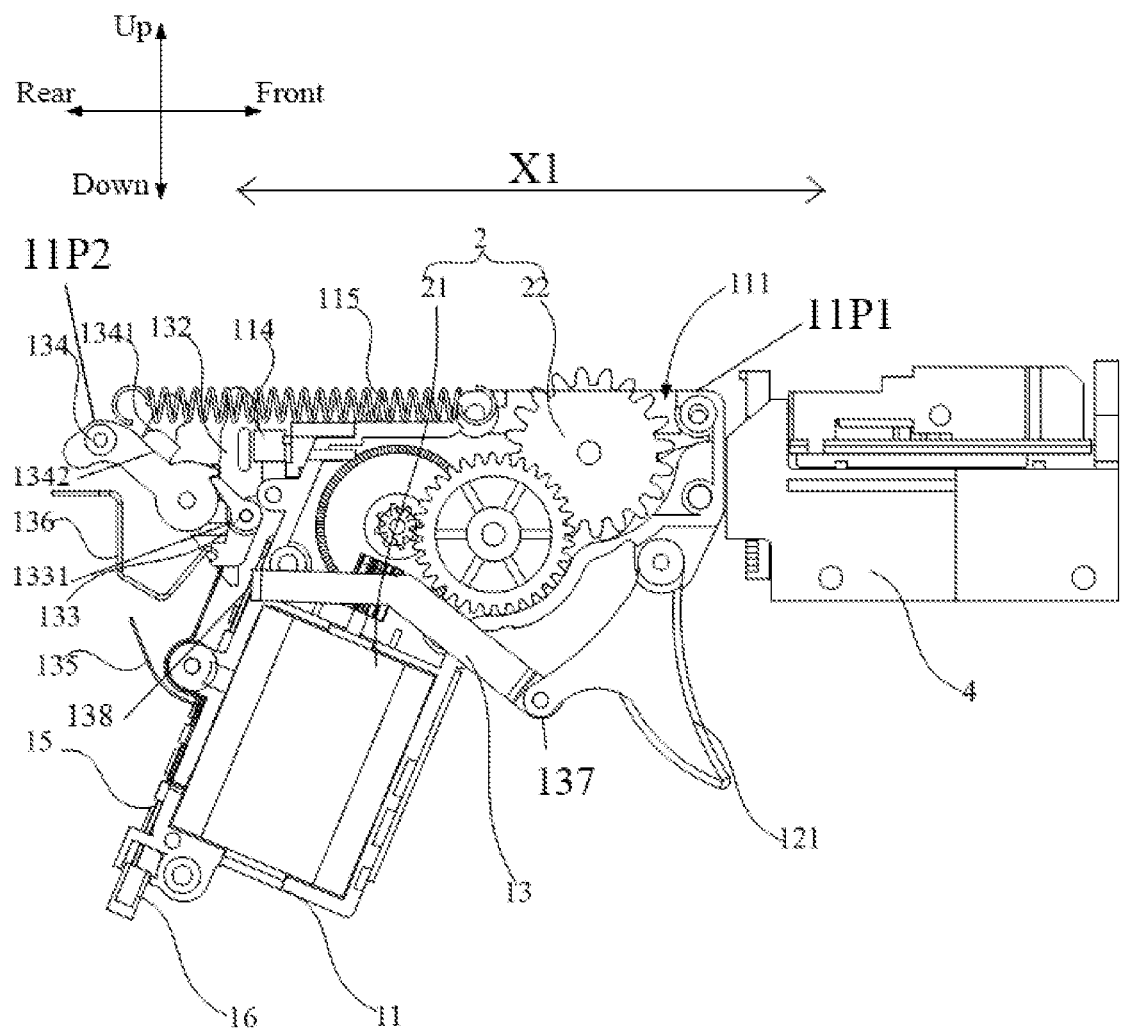
FIG. 2 is a structural schematic view of partial structures of the imitational laser-shooting simulated gun of FIG. 1.
Figure 3:
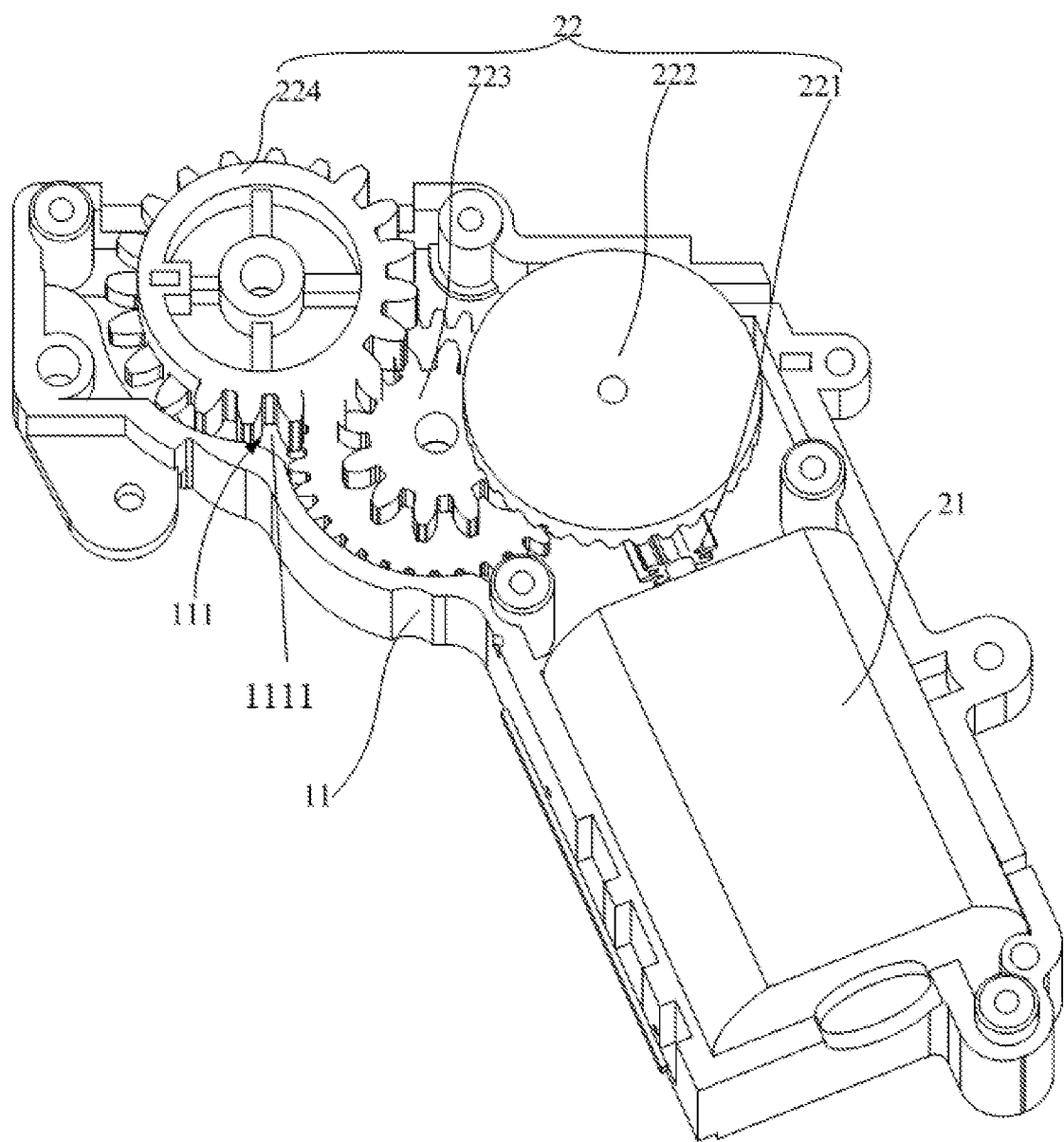
FIG. 3 is a structural schematic view of a gear box module in FIG. 2.
Figure 5:
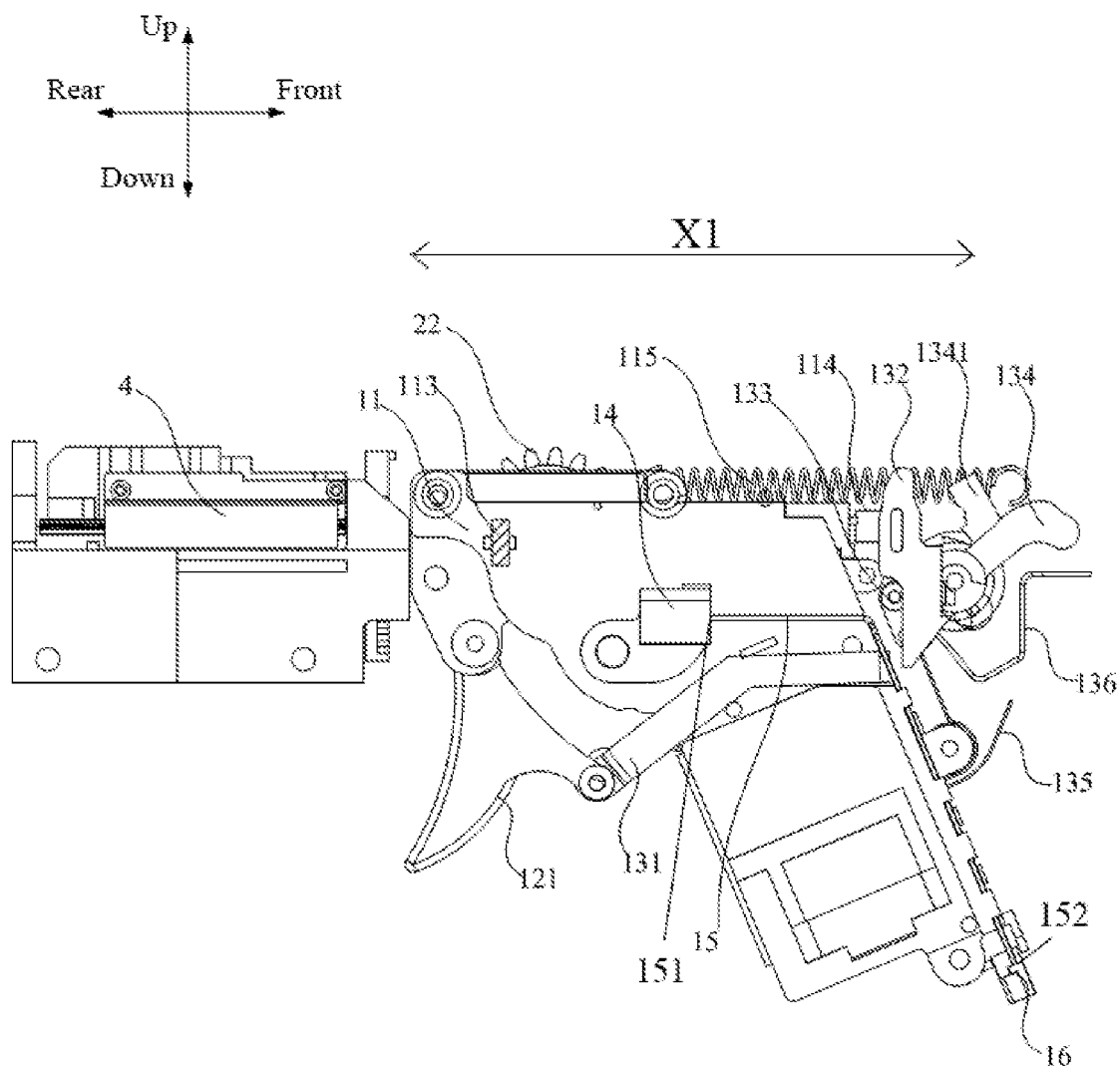
FIG. 5 is a structural schematic view of the imitational laser-shooting simulated gun of FIG. 2, viewed from another angle.
Figure 6:
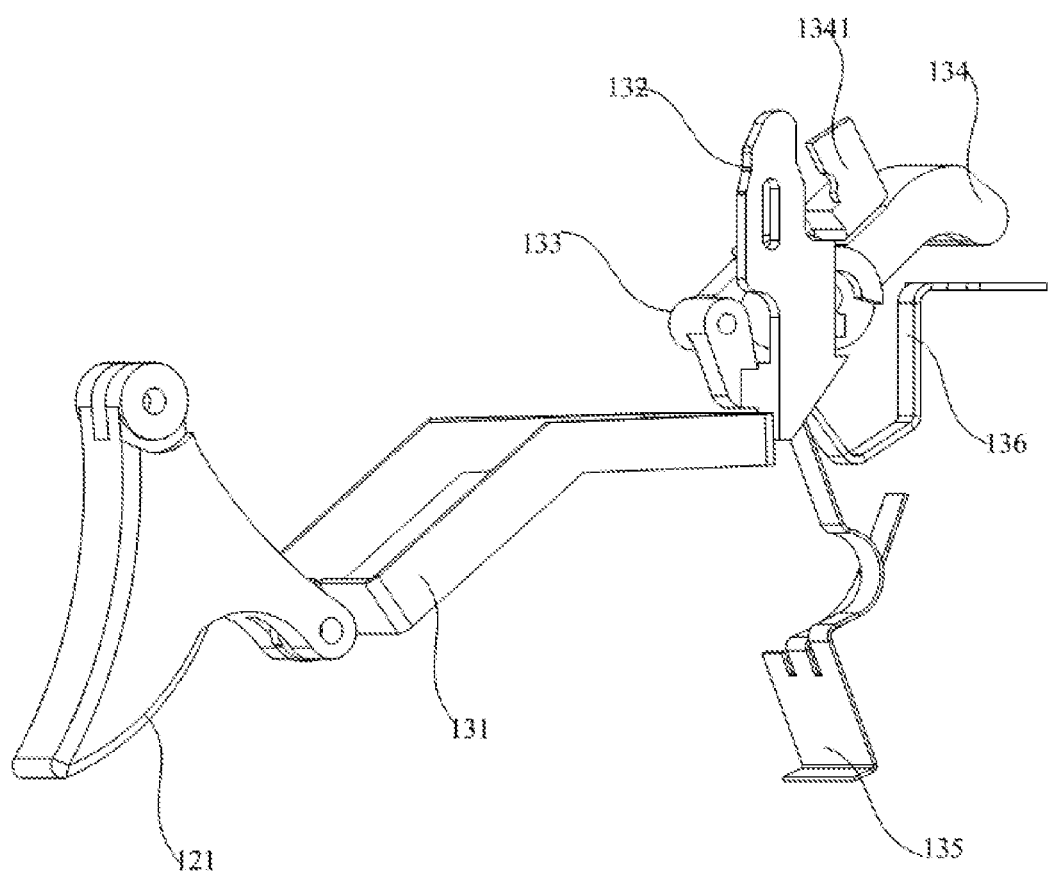
FIG. 6 is a structural schematic view of a transmission assembly in FIG. 5.
Figure 13:
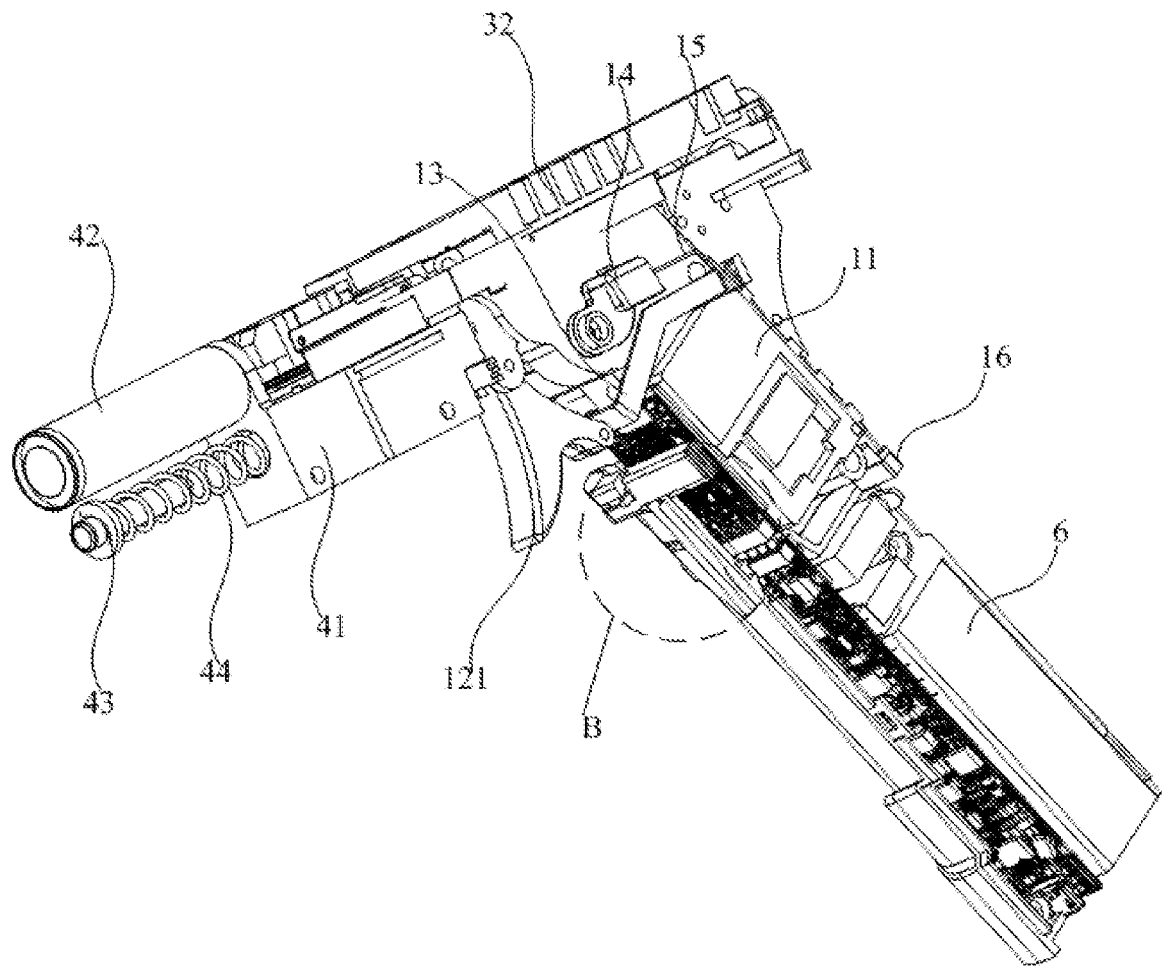
FIG. 13 is a structural schematic view of the imitational laser-shooting simulated gun of FIG. 1, viewed from another angle.
Figure 14:
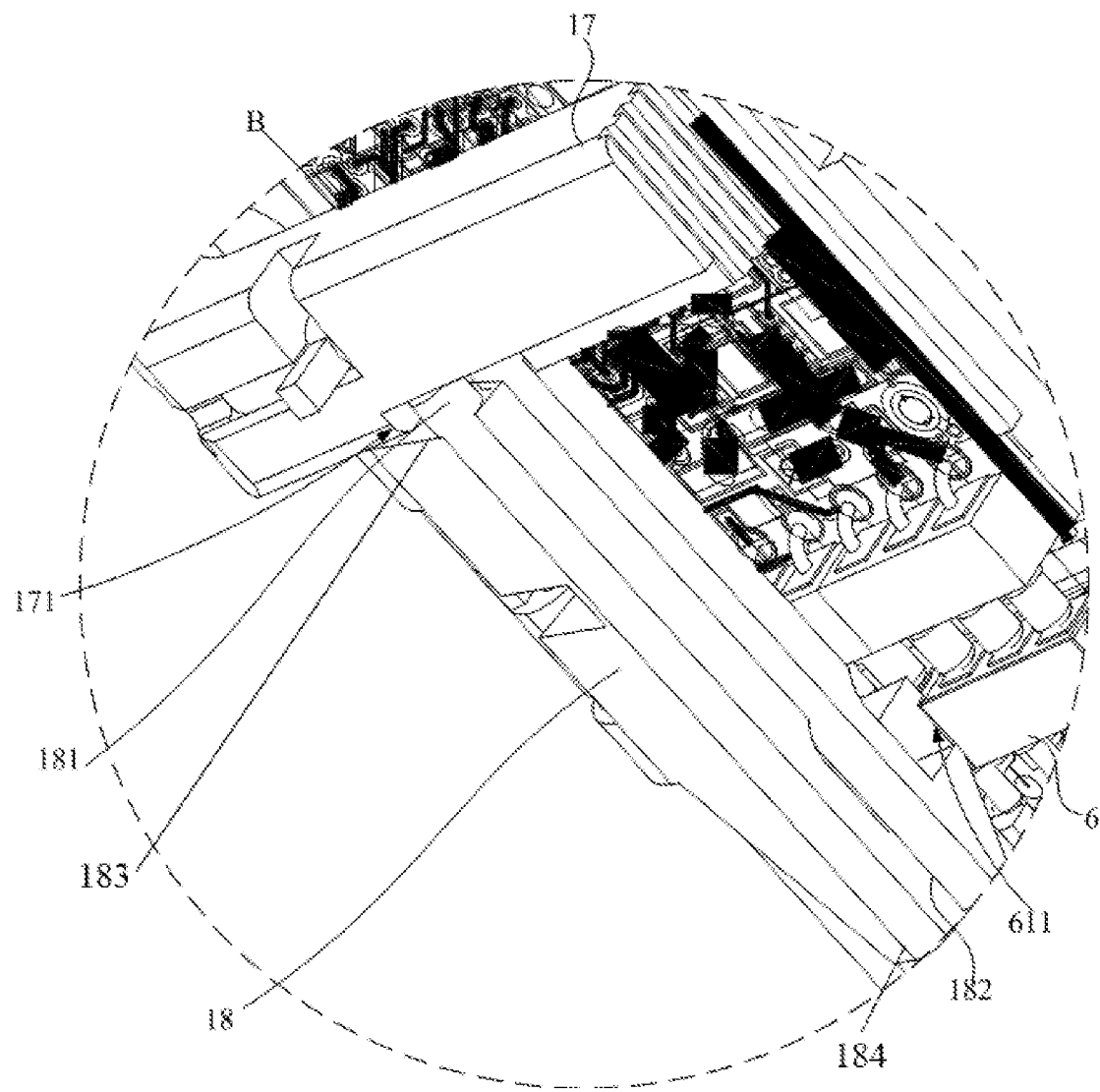
FIG. 14 is an enlarged view of portion B in FIG. 13.

The present disclosure discloses an imitational laser-shooting simulated gun. Referring to FIG. 1, a structural schematic view of an embodiment of an imitational laser-shooting simulated gun D2 according to the present disclosure is shown; referring to FIG. 2, a structural schematic view of partial structures of the imitational laser-shooting simulated gun D2 of the FIG. 1 is shown; referring to FIG. 3, a structural schematic view of a gear box in the FIG. 2 is shown; referring to FIG. 4, a structural schematic view of a tertiary gear in FIG. 3 is shown; referring to FIG. 5, a structural schematic view of another angle of the imitational laser-shooting simulated gun D2 is shown; Referring to FIG. 6, a structural schematic view of a transmission assembly in FIG. 5 is shown; referring to FIG. 7, a structural schematic view of a blocking module in FIG. 5 is shown; referring to FIG. 8, a structural schematic view of a blocking panel is shown; referring to FIG. 9, a structural schematic view of a sliding shell module in FIG. 1 is shown; referring to FIG. 10, a structural schematic view of a charger module in FIG. 1 is shown; referring to FIG. 11, a structural schematic view of another part of the imitational laser-shooting simulated gun D2 of FIG. 1 is shown; referring to FIG. 12, an enlarged view of portion A of FIG. 11 is shown; referring to FIG. 13, a structural schematic of another angle of the imitational laser-shooting simulated gun D2 of FIG. 11 is shown; referring to FIG. 14, an enlarged view of portion B in FIG. 13 is shown; referring to FIG. 15, a structural schematic view of a charger lock of FIG. 14 is shown; and referring to FIG. 16, a structural schematic view of a charger swing buckle of FIG. 14 is shown.

The imitational laser-shooting simulated gun D2 of the present disclosure, as shown in FIG. 1, in conjunction with FIG. 2 and FIG. 3, includes a handle module 1, a gear box module 2 and a sliding shell module 3. The gear box module 2 is set in the handle module 1, the sliding shell module 3 is slidably connected with the handle module 1, and the sliding shell module 3 is further engagingly connected with the gear box module 2.

Based on the above, a front end 1P1 and a rear end 1P2 are defined in a length direction X of the handle module 1. The gear box module 2 drives the sliding shell module 3 to move back and forth in the length direction X of the handle module 1, so that the sliding shell module 3 is sequentially getting closer or away from the front end 1P1 and the rear end 1P2, so that a sense of recoil force is generated when the imitational laser-shooting simulated gun D2 is used by a user.

In one embodiment of the present disclosure, the handle module 1 includes a housing 11, an outer cover 12 and a trigger 121. The housing 11 is defined with an installation groove 111. The outer cover 12 partially covers the housing 11. The installation groove 111 is set open, the trigger 121 is rotatably set on the housing 11 and is exposed out of the housing 12, and the trigger 121 is configured to generate a triggering signal for shooting. The gear box module 2 includes a motor 21 and a gear set 22 disposed in the installation groove 111. The motor 21 is connected with the gear set 22, the sliding shell module 3 is slidably connected with the outer cover 12, the sliding shell module 3 covers the installation groove 111 and is engagingly connected with the gear set 22.

In some embodiments, the gear box module 2 drives the sliding shell module 3 to reciprocate on the housing 11 according to the triggering signal so as to form a sense of recoil force. That is, a user can actuate the trigger 121 to enable the trigger 121 to cooperate with a corresponding circuit structure to generate a triggering signal for shooting, and then the circuit structure starts the motor 21 to drive the gear set 22 to be in transmission fit with the sliding shell module 3 according to the triggering signal, so as to move the sliding shell module 3.

In this embodiment, by arranging the gear box module 2 in the housing 11, slidably setting the sliding shell module 3 on the outer cover 12 and cover the notch of the installation groove 111, the sliding shell module 3 is thus engagingly connected with the gear box module 2. At the same time, the trigger 121 is set on the housing 11, and a user triggers the trigger 121 to generate a triggering signal to enable the gear box module 2 to operate. The gear box module 2 drives the sliding shell module 3 to slide on the outer cover 12 so as to move the sliding shell module 3 forward or backward relative to the housing 11, thereby realizing the recoil feeling of simulating the shooting of a real gun. According to the imitational laser-shooting simulated gun D2 of the present disclosure, simulation of the recoil force of the imitational laser-shooting simulated gun D2 is realized, and the degree of simulation is optimized. Meanwhile, shooting training for the user is realized based on the imitational laser-shooting simulated gun, and the operation safety can be improved while a sense of reality is achieved.

It can be understood that when the user is holding the imitational laser-shooting simulated gun D2, an end of the imitational laser-shooting simulated gun D2 away from the human body is the front end 1P1, and an end on the opposite direction to the front end is the rear end 1P2. The gear box module 2 drives the sliding shell module 3 to move a certain distance toward the rear end 1P2 relative to the outer cover 12 when the gear box module 2 is operated according to the trigger signal, and then the sliding shell module 3 is reset forwards to form the sense of recoil force.

Optionally, the circuit structure is a circuit board of a conventional model, and a trigger switch and a micro-control unit electrically connected with the trigger switch are set on the circuit board. That is, the trigger 121 is close to or away from the trigger switch such that the trigger switch generates a triggering signal for shooting. In particular, the circuit board may be a flexible printed circuit board, or a rigid PCB, or the circuit board may be an integrate component of a flexible printed circuit board and a rigid PCB.

Optionally, the trigger switch can be an induction switch or a mechanical switch. In particular the inductive switch can be a photoelectric induction switch or an electromagnetic induction switch, etc.

Optionally, an outer shape of the outer cover 12 is a profile of a hand gun. In particular, the outer cover 12 partially covering the housing 11 refers that the housing 11 serving as an installation component for installing the gear box module 2, and an outer portion of the housing 11 being coated with the outer cover 12 so as to achieve beautiful appearance; meanwhile, the sliding shell module 3 is slidably connected with the outer cover 12, and the outer cover 12 also has the function of installing the sliding shell module 3.

Optionally, the gear set 22 is provided in the installation groove 111, and partially extends out of an opening of the installation groove 111 so that the gear set 22 can be engaged with the sliding shell module 3. In particular, a rack is set on one side of the sliding shell module 3 facing the gear set 22, and the rack is engaged with the gear set 22.

Optionally, the gear set 22 can also be located in the installation groove 111, and the rack of the sliding shell module 3 can be partially extended into the installation groove 111 and engaged with the gear set 22. On the premise that the sliding shell module 3 and the gear set 22 can be engaged, it is not limited whether the gear set 22 extends out of the opening of the installation groove 111.

In one embodiment of the present disclosure, the gear box module 2 further includes a magnetic member 23 set on the gear set 22. The handle module 1 further includes a Hall sensor 113. The Hall sensor 113 is set corresponding to the gear set 22 and on one side of the outer cover 12 facing the housing 11. The Hall sensor 113 is electrically connected with the motor 21 and configured to sense the magnetic member 23 to adjust a rotation of the motor 21. In particular, the Hall sensor 113 is electrically connected with the motor 21, which can be understood as that the Hall sensor 113 and the motor 21 are jointly connected to the circuit board, the circuit board acquires a position of the magnetic member 23 through the Hall sensor 113, and then adjust a rotation state of the motor 21ed.

In this embodiment, when the outer cover 12 is partially covering the housing 11, a receiving gap is formed between the outer cover 12 and the housing 11. When a Hall sensor 113 is set on the outer cover 12, the Hall sensor 113 can be located at the receiving gap. During use, the gear set 22 rotates such that the magnetic member 23 rotates, and the Hall sensor 113 senses the position of the magnetic member 23. After the hall sensor 113 obtains the position of the magnetic member 23, the hall sensor 113 generates a pulse signal to enable the circuit board to adjust the rotation state of the motor 21.

Optionally, the rotation state of the motor 21 can be: stopping, speeding up, reversing or speeding down.

In this embodiment, when the gear set 22 drives the magnetic member 23 to rotate, the sliding shell module 3 slides on the outer cover 12. In order to improve the speed at which the sliding shell module 3 advances to the front end 12P1 and returns to the rear end 12P2 on the outer cover 12, and to improve the recoil feeling of the user, the rotation state of the motor 21 can be the reversing.

Optionally, the housing 11 may also be defined with an induction hole (not labeled) corresponding to the Hall sensor 113, and the induction hole is communicated with the installation groove 111 and an outer wall surface of the housing 11 so as to facilitate the positioning of the Hall sensor 113, and at the same time to improve the sensitivity of the Hall sensor 113.

Figure 4:
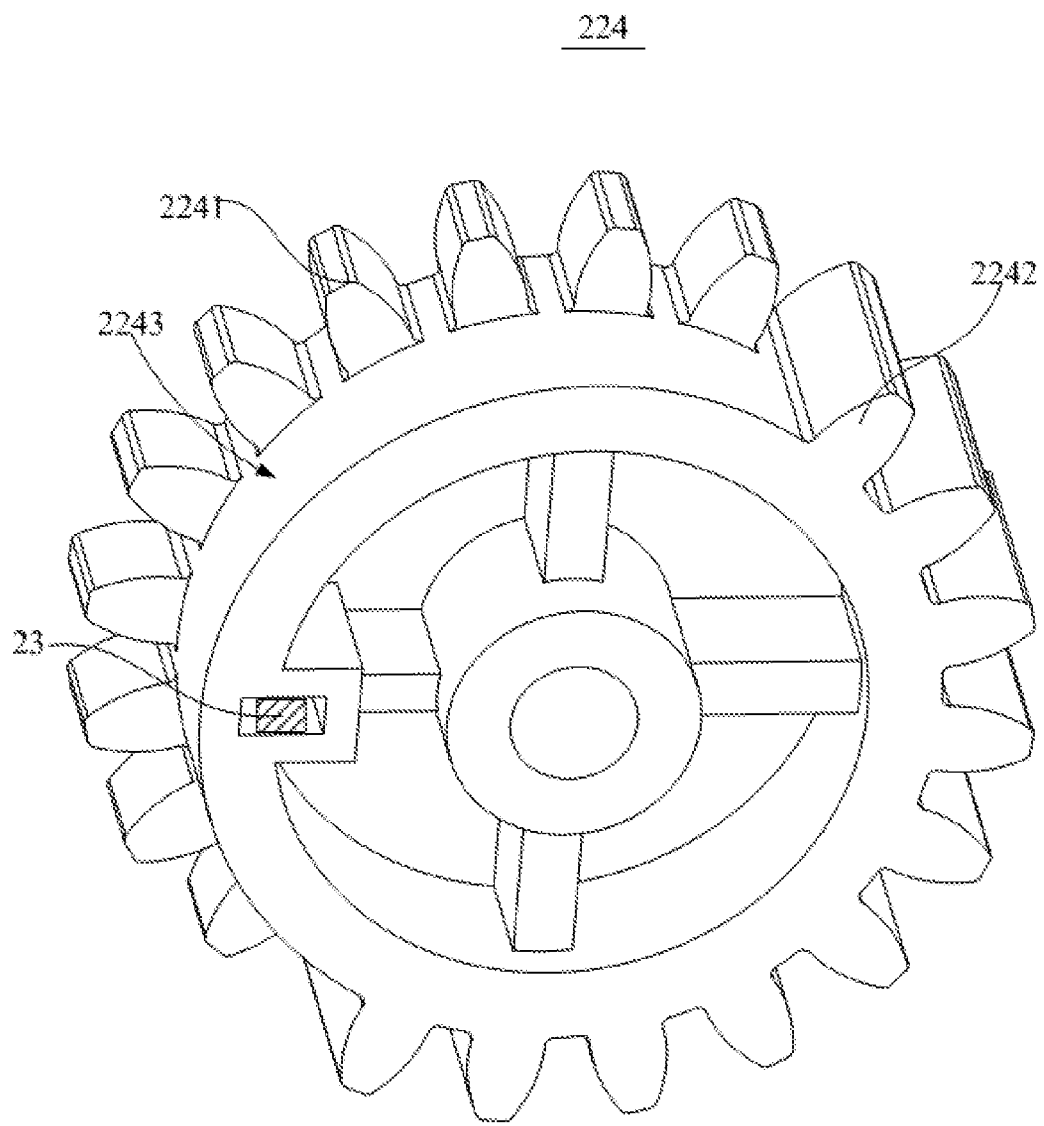
FIG. 4 is a structural schematic view of a tertiary gear in FIG. 3.

In one embodiment, as shown in FIG. 3 and FIG. 4, the gear set 22 includes a primary gear 221, a crown gear 222, a secondary gear 223 and a tertiary gear 224; an output shaft of the motor 21 is engagingly connected with the crown gear 222 through the primary gear 221. The crown gear 222, the secondary gear 223 and the tertiary gear 224 are rotatably set in the installation groove 111, and the tertiary gear 224 is engagingly connected with the sliding shell module 3.

The magnetic member 23 is set on the tertiary gear 224 and is located at a centrifugal position of the tertiary gear 224.

The motor 21 drives the primary gear 221, the crown gear 222, the secondary gear 223 and the tertiary gear 224 to rotate so as to drive the sliding shell module 3 to reciprocate along a length direction X3 of the outer cover 12.

In this embodiment, due to the configuration of the hand gun including a bent hand holding part and a straight gun barrel part, in the installation of the gear box module 2, the gear box module 2 needs to be installed at the hand holding part. Meanwhile, due to the fact that the hand holding part is of a long strip structure, the installation groove 111 of the housing 11 is a long strip groove, and the motor 21 cannot be horizontally placed. Therefore, the motor 21 is vertically set at the hand holding part (i.e., the motor 21 is vertically set in the installation groove 111), and the gear set 22 is set at the opening of the installation groove 111 so as to convert the kinetic energy generated by the output shaft of the motor 21 into the direction parallel to the position of the gun barrel part (i.e., the sliding direction of the sliding shell module 3) through the gear set 22, so as to facilitate the gear set 22 to drive the sliding shell module 3 to slide.

In this embodiment, the tertiary gear 224 is configured with the magnetic member 23, and it can be understood that the tertiary gear 224 is the last gear that is engaged with the sliding shell module 3, by obtaining a rotation state of the tertiary gear 224, a control to the motor 21 to rotate is more efficient.

In this embodiment, in combination with FIG. 3 and FIG. 4, a periphery of the tertiary gear 224 is provided with a first tooth section 2241 and a second tooth section 2242, the first tooth section 2241 and the second tooth section 2242 are sequentially connected and surround the periphery of the tertiary gear 224. The tertiary gear 224 corresponding to the first tooth section 2241 further configured with a space-avoiding area 2243, the space-avoiding area 2243 and the first tooth section 2241 are set side by side. In this embodiment, the first tooth section 2241 and the second tooth section 2242 are engagingly connected with the sliding shell module 3, and the second tooth section 2242 is further engagingly connected with the secondary gear 223. The space-avoiding area 2243 corresponds to the secondary gear 223.

In this embodiment, the first tooth section 2241 and the second tooth section 2242 are set around the periphery of the tertiary gear 224, and the two ends of the first tooth section 2241 correspondingly adjoin with the two ends of the second tooth section 2242. Specifically, an axial direction of the tertiary gear 224 is defined as a transverse direction, a length of the first tooth section 2241 in the transverse direction is smaller than a length of the periphery of the tertiary gear 224 in the transverse direction, so as to form the space-avoiding area 2243 on the periphery of the tertiary gear 224.

Based on the above, a length of the first tooth section 2241 along a circumferential direction of the tertiary gear 224 is defined as a first length, and a length of the space-avoiding area 2243 along the circumferential direction of the tertiary gear 224 is defined as a second length. The first length is equivalent to the second length. Thereby, the space-avoiding area 2243 is a long-strip vacant area on the periphery of the tertiary gear 224, and two ends of the space-avoiding area 2243 correspondingly adjoin with the two ends of the second tooth section 2242 respectively.

In this embodiment, the first tooth section 2241 and the second tooth section 2242 are engagingly connected with the secondary gear 223, the second tooth section 2242 is further engagingly connected with the sliding shell module 3, and the space-avoiding area 2243 corresponds to the sliding shell module 3. It could be understood that the tertiary gear 224 can be considered to be completely engagingly connected with the sliding shell module 3 through the first tooth section 2241 and the second tooth section 2242, so that the transmission stability is improved. Meanwhile, the tertiary gear 224 is engagingly connected with the secondary gear 223 through the second tooth section 2242, and are corresponding to the secondary gear 223 through the space-avoiding area 2243, so that when the secondary gear 223 rotates to the space-avoiding area 2243, there is no engaging connection between the secondary gear 223 and the tertiary gear 224, so that the tertiary gear 224 does not drive the sliding shell module 3 to move so as to facilitate the resetting of the sliding shell module 3.

In particular, when there is no engaging connection between the secondary gear 223 and the tertiary gear 224, a reset structure can be present between the sliding shell module 3 and the handle module 1, so that a force of the tertiary gear 224 applied on the sliding shell module 3 is eliminated, and meanwhile, the sliding shell module 3 can be reset relative to the handle module 1. It is understandable that, the reset structure can be a spring 413, and the spring 413 generates a reaction force for reducing the movement of the sliding shell module 3, so as to facilitate the sliding of the sliding shell module 3 to the initial position.

In one embodiment, the housing 11 has a front end 11P1 and a rear end 11P2, the reset structure can be a blocking module 4 set at the front end 11P1 of the housing 11, and the blocking module 4 generates a force applied to the sliding shell module 3 toward the front end 11P1 of the housing 11, to facilitate a forward reset of the sliding shell module 3.

In one embodiment, the magnetic member 23 is set on the tertiary gear 224 and is located at the centrifugal position of the tertiary gear 224 to facilitate the Hall sensor 113 to acquire the position of the magnetic member 23 on the tertiary gear 224, so as to drive the motor 21 to rotate reversely. When the sliding shell module 3 is reset forward corresponding to the housing 11, an advancing speed is increased, and an effect of simulating a real gun is improved.

Optionally, the first tooth section 2241 covers ½ of the periphery of the tertiary gear 224 along the circumferential direction; and the second tooth section 2242 covers another ½ of the periphery of the tertiary tooth 224 along the circumferential direction.

In one embodiment, as shown in FIG. 2, FIG. 5, and FIG. 6, the front end 11P1 and the rear end 11P2 are defined in the length direction X1 of a housing 11; the handle module 1 further includes a sensing assembly 114 and a transmission assembly 13. The sensing assembly 114 is set at the rear end 11P2 of the housing 11, and the sensing assembly 114 is electrically connected with the gear box module 2. The transmission assembly 13 is movably set in the installation groove 111 and spaced from the gear box module 2, and the transmission assembly 13 is connected with the trigger 121. In particular, the sensing assembly 114 can be considered as an inductive switch, such as an electromagnetic induction switch or a photoelectric induction switch.

It is understood that the sensing assembly 114 may be electrically connected to a circuit of the gear box module 2. The trigger 121 is swung to drive the transmission assembly 13 to get close to or away from the sensing assembly 114 to drive the sensing assembly 114 to generate a triggering signal for shooting.

In this embodiment, the trigger 121 is adopted to drive the transmission assembly 13 to trigger the sensing assembly 114, so that a damping feeling of moving between the transmission assembly 13 and the trigger 121 is obtained, and the effect of simulating the real gun is improved.

In this embodiment, according to FIG. 2, FIG. 5 and FIG. 6, the transmission assembly 13 includes a transmission component 131, a floating shifting component 132, a hammer lock 133 and a hammer 134 which are movably set in the installation groove 111. One end 1311 of the transmission component 131 is connected with the trigger 121, and the other end 1312 of the transmission component 131 abuts against the floating shifting component 132. The floating shifting component 132 abuts against the hammer lock 133, the hammer lock 133 abuts against a circumferential side of the hammer 134 and is limited by the circumferential side of the hammer 134, and the hammer 134 is located at the rear end 11P2 of the housing 11.

The handle module 1 further includes a tension spring 115, one end of the tension spring 115 is connected with the hammer 134, and the other end of the tension spring 115 is connected with the rear end 11P2 of the housing 11. The tension spring 115 applies a force to the hammer 134 toward the sensing assembly 114. That is, after an abutting force applied on the hammer 134 by the hammer lock 133 is revoked, the hammer 134 is close to the induction component 114 under the action of the tension spring 115 to obtain a triggering, and the effect of simulating a real gun is obtained.

The trigger 121 is swung to drive the transmission component 131 to move, the transmission component 131 pushes the floating shifting component 132 to move, and the floating shifting component 132 drives the hammer lock 133 to rotate, so that the hammer lock 133 revokes the force applied on the hammer 134.

In one embodiment, the transmission assembly 13 further includes a floating elastic piece 135 and a hammer locking elastic piece 136 which are connected with an inner surface 1111 of the installation groove 111. The floating elastic piece 135 abuts against the floating shifting component 132 and applies a force to the floating shifting component 132 toward the transmission component 131. The hammer lock elastic piece 136 abuts against the hammer lock 133 and applies a force which is intended to rotate the hammer lock 133 toward the hammer 134 to a periphery 1331 of the hammer lock 133.

In the embodiment, the floating elastic component 135 and the hammer locking elastic piece 136 are set in the installation groove 111, the floating elastic component 135 abuts against the floating shifting component 132, and the hammer locking elastic piece 136 abuts against the hammer lock 133 to realize resets of the hammer lock 133 and the floating shifting component 132, and an effect of simulating the real gun is obtained.

In one embodiment, a triggering piece 1341 is set on a side 1342 of the hammer 134, facing the sensing assembly 114. The sensing assembly 114 is a photoelectric switch. In other words, the photoelectric switch is defined with an induction groove, inner wall surfaces of the induction groove are configured with a light receiving terminal and a light transmitting terminal opposite to the light receiving terminal. After the triggering piece 1341 enters the induction groove, the triggering piece 1341 blocking light transmitting between the light receiving terminal and the light transmitting terminal is taken as one triggering. As a result, the gear box module 2 is operated, and a sliding of the sliding shell module 3 is achieved.

In the embodiment, when a trigger is generated between the hammer 134 and the induction switch, the gear box module 2 and the sliding shell module 3 cooperate to realize a simulated recoil motion, and furthermore, the transmission component 131, the floating shifting component 132, the hammer lock 133 and the hammer 134 are restored to the original position under the actions of the floating elastic piece 135 and the hammer lock elastic piece 136, to prepare for the next buckling on the trigger 121.

Figure 7:
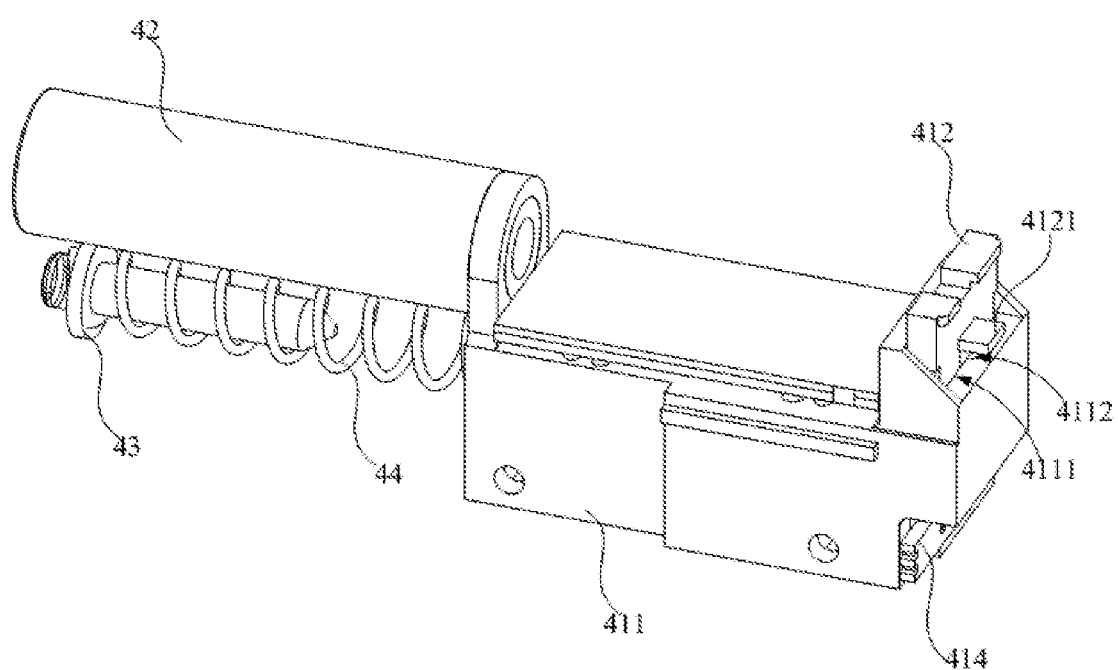
FIG. 7 is a structural schematic view of a blocking module in FIG. 5.

In an embodiment, according to FIG. 7, the imitational laser-shooting simulated gun D2 further includes a blocking module 4 set at the front end 11P1 of the housing 11. The blocking module 4 includes a front rail frame 41 and a reciprocating spring reverse pin 43. The front rail frame 41 is set at the front end 11P1 of the housing 11; and the reciprocating spring reverse pin 43 is set on a side 415 of the front rail frame 41 away from the housing 11. The reciprocating spring reverse pin 43 abuts against the front rail frame 4 through a reciprocating spring 44. An end 431 of the reciprocating spring reversing pin 43 away from the reciprocating spring 44 abuts against the sliding shell module 3.

The outer cover 12 partially covers the blocking module 4. The sliding shell module 3 is slidably connected with the front rail frame 41. A reciprocating spring reverse pin hole 312 is defined on the sliding shell module 3 corresponding to the reciprocating spring reverse pin 43. A periphery 3121 of the reciprocating spring reverse pin hole 312 abuts against the reciprocating spring reverse pin 43, and the reciprocating spring reverse pin 43 and the reciprocating spring 44 cooperates to apply an action force to the sliding shell module 3 toward the front end 11P1.

Based on the above, a structure where the reciprocating spring reverse pin 43 and the reciprocating spring 44 are matched is adopted, so that an automatic reset of the sliding shell module 3 is obtained, a motion of a gun shooting once is simulated by the gear box module 2, the simulated recoil sense is realized, and the simulation effect of the imitational laser-shooting simulated gun D2 is improved.

In this embodiment, the blocking module 4 is connected with the housing 11, an extension line of the blocking module 4 is set to have an included angle with the extension line of the housing 11, the orthographic projection shape formed by connecting the blocking module 4 and the housing 11 is the same as the shape of the gun, the outer cover 12 covers the blocking module 4 and the housing 11 to improve the appearance of the imitational laser-shooting simulated gun D2 and improve the simulation effect of the imitational laser-shooting simulated gun.

Figure 8:
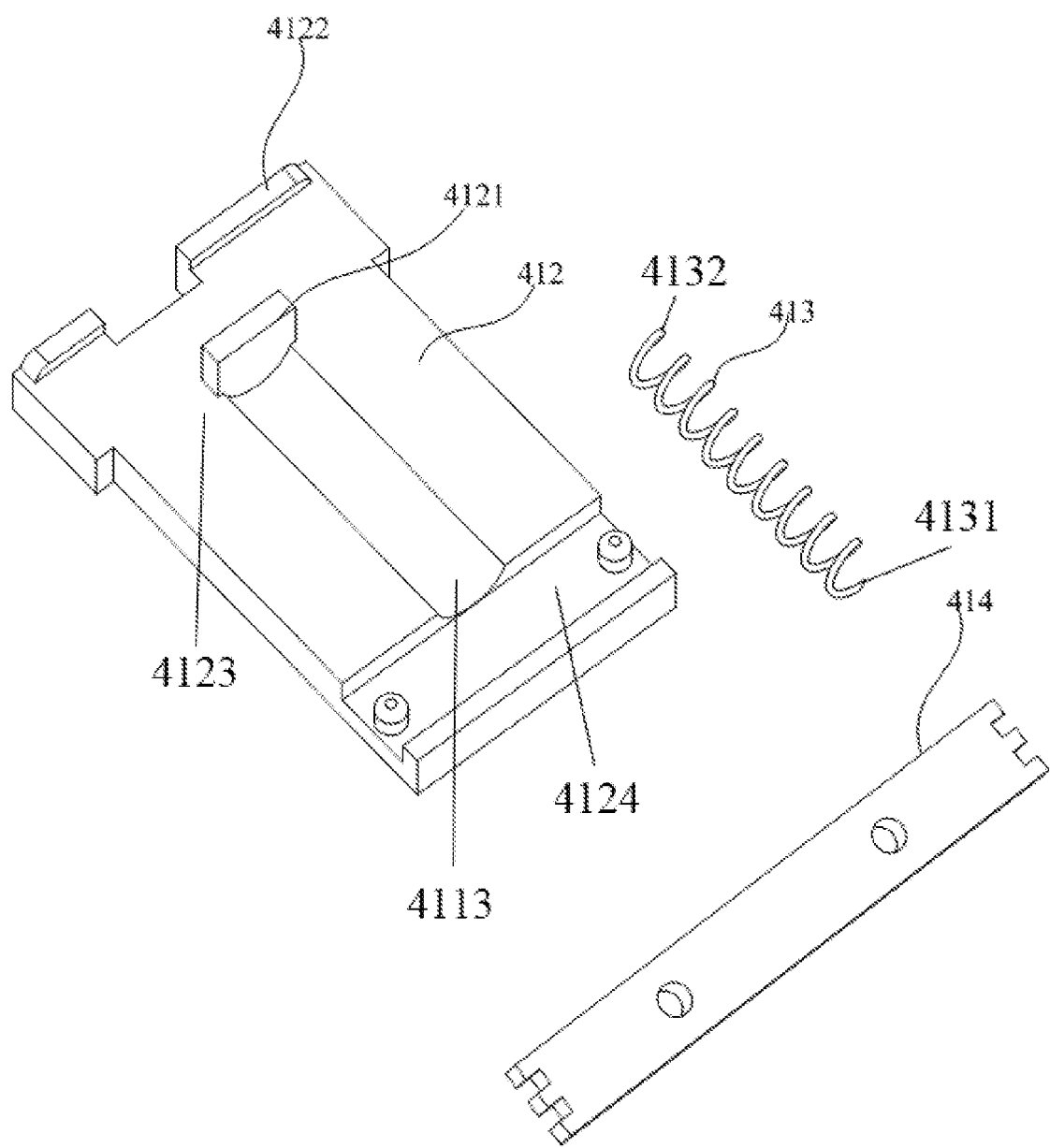
FIG. 8 is a structural schematic view of a blocking panel in FIG. 7.

In an embodiment, according to FIG. 7 and FIG. 8, the sliding shell module 3 is further defined with a gun hole 313, and the gun hole 313 is set at interval with the reciprocating spring reverse pin hole 312. The blocking module 4 further includes a gun barrel 42, the gun barrel 42 is set on a side 415 of the front rail frame 41 away from the housing 11, the gun barrel 42 is set side by side with the reciprocating spring reverse pin 43, and penetrates through the gun hole 313.

In this embodiment, the gun barrel 42 is set on the side of the front rail frame 41 away from the housing 11, and the gun barrel 42 is set in the gun hole 313 in a penetrating manner so as to improve the simulation effect of the imitational laser-shooting simulated gun D2.

In an embodiment, a barrel hole is defined in the middle of the gun barrel 42. A laser module 5 may be configured at the gun barrel 42, or the laser module 5 may be configured on the front rail frame 41. A laser generated by the laser module 5 can be emitted from the barrel hole in the middle of the gun barrel 42.

In one embodiment, according to FIG. 7 and FIG. 8, the front rail frame 41 includes a frame body 411, a blocking panel 412, a spring 413 and a blocking-and-compressing component 414.

The frame body 411 is connected with the housing 11. A plug-in hole 4111 and a spring groove 4112 are defined in an end of the frame body 411 adjacent to the housing 11. The spring groove 4112 is communicated with the plug-in hole 4111. The blocking panel 412 is set in the plug-in hole 4111 in a penetrating manner, and a surface 4123 of the blocking panel 412 is convexly formed with a pressure spring blocking sheet 4121 corresponding to the spring groove 4112. The spring 413 is set in the spring groove 4112, an end 4131 of the spring 413 abuts against a bottom wall 4113 of the spring groove 4112, the other end 4132 of the spring 413 abuts against the pressure spring blocking sheet 4121, so that the blocking panel 412 partially extrudes out of the plug-in hole 4111, and the blocking panel 412 abuts against the sliding shell module 3. The blocking-and-compressing component 414 is fixedly connected to an end 4124 of the blocking panel 412 that protrudes out of the plug-in hole 4111, so that the blocking panel 412 is positioned at the plug-in hole 4111.

In this embodiment, the sliding shell module 3 can be slidably connected with the frame body 411.

Optionally, the blocking-and-compressing component 414 is connected to the blocking panel 412, and a size of the blocking panel 412 is larger than a size of the plug-in hole 4111.

Figure 9:
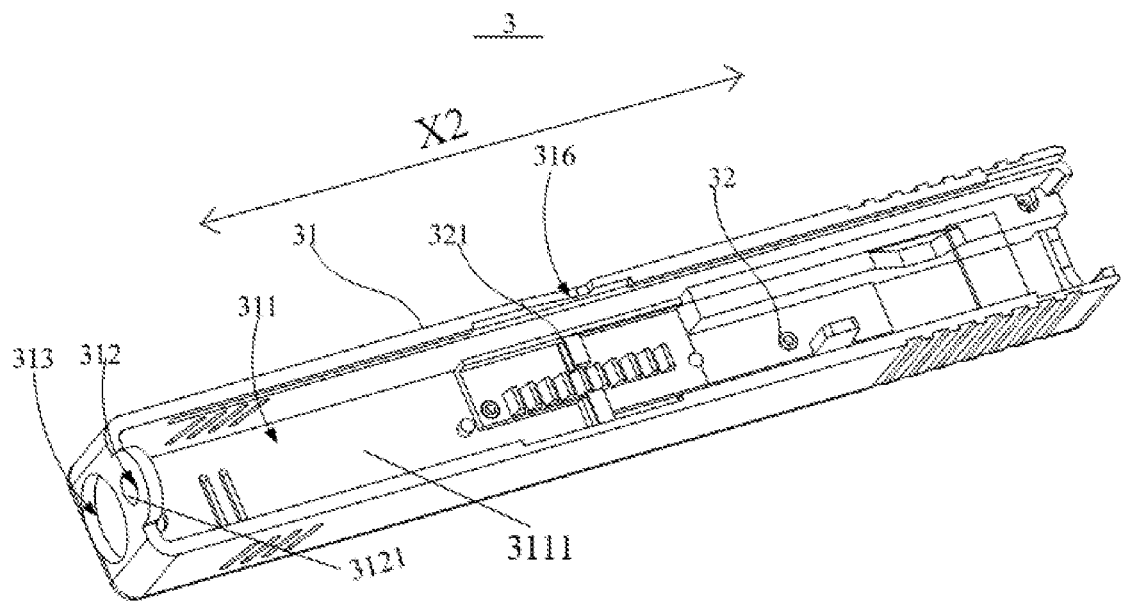
FIG. 9 is a structural schematic view of a sliding shell module in FIG. 1.

In one embodiment, according to FIG. 7, FIG. 8 and FIG. 9, an anti-disassembling buckle 4122 is convexly set on a surface 4123 of the blocking panel 412 away from the gun barrel 42. The sliding shell module 3 is configured with an anti-tripping buckle 321 corresponding to the anti-disassembling buckle 4122, and the anti-disassembling buckle 4122 abuts against the anti-tripping buckle 321.

That is, a containing groove 311 is formed on a side of the sliding shell module 3 facing the housing 11. A transmission rack 32 is configured on an inner wall surface of the containing groove 311, and the anti-tripping buckle 321 is convexly configured on the inner wall surface of the containing groove 311, thus when the sliding shell module 3 slides forwards or backwards, the sliding shell module 3 is prevented from pressing the blocking panel 412, so that the accident that the sliding shell module 3 is separated is avoided.

In one embodiment, the imitational laser-shooting simulated gun D2 further includes a laser module 5 set on the handle module 1 or the gun barrel 42. A laser is emitted by the laser module 5, shot through the gun barrel 42.

Figure 18:
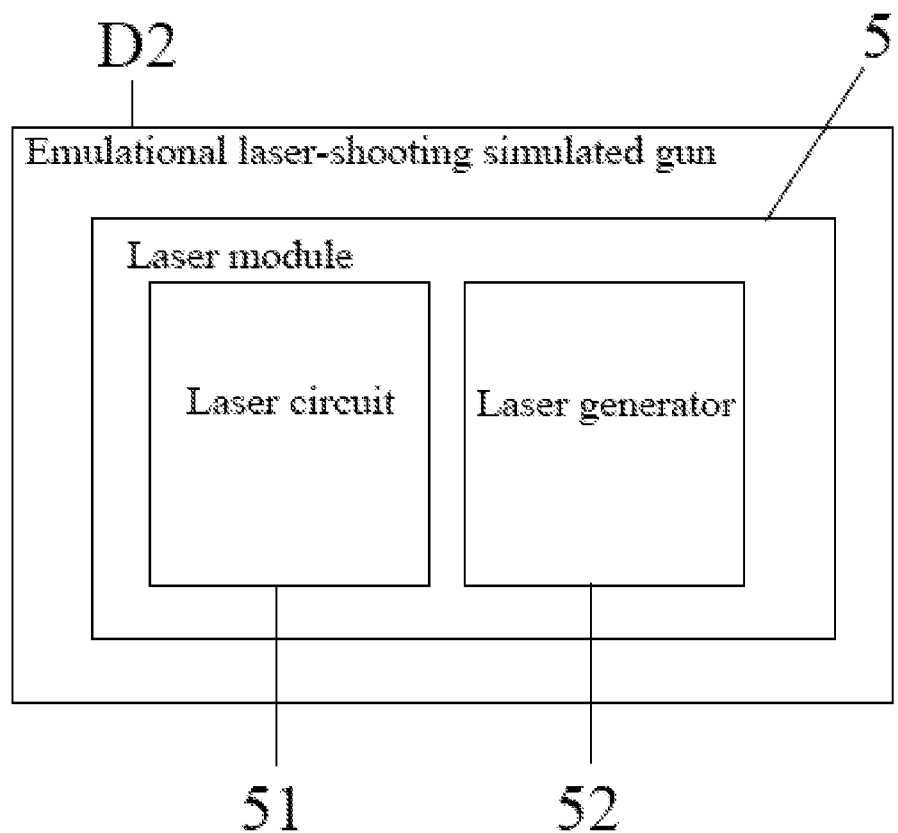
FIG. 18 is a schematic diagram of a laser module according to an embodiment of the present disclosure.

In this embodiment, according to FIG. 18, the laser module 5 includes a laser circuit 51 and a laser generator 52. The laser generator is electrically connected with the laser circuit. The laser circuit can be electrically connected with a circuit that is electrically connecting with the gear box module 2 and/or a circuit that is connecting with the sensing assembly 114. When the gear box module 2 or the sensing assembly 114 is triggered, the laser circuit can be triggered together to realize the light emitting of the laser generator.

In one embodiment, according to FIG. 9, the sliding shell module 3 includes a sliding shell component 31 and the transmission rack 32. The sliding shell component 31 defines the containing groove 311, the reciprocating spring reverse pin hole 312 and the gun hole 313 which are communicating with the containing groove 311. The transmission rack 32 is set on a bottom wall 3111 of the containing groove 311. Optionally, the transmission rack 32 is a structure fixed on the sliding shell component 31, and a arrangement direction of the transmission rack 32 is the same as a length direction X2 of the sliding shell component 31.

The sliding shell component 31 is connected with the handle module 1, and the transmission rack 32 is engagingly connected with the gear set 22.

In this embodiment, the sliding shell component 31 can be connected with the outer cover 12 through a sliding groove and a sliding rail, that is, a sliding groove is formed between two opposite sides of the outer cover 12, a sliding rail is set on an inner wall surface of the containing groove 311, and the sliding rail is slidably set in the sliding groove. On the other hand, the sliding shell component 31 can also be connected with the frame body 411 of the front rail frame 41 through a sliding groove and a sliding rail.

In one embodiment, according to FIG. 1, an outer surface 33 of the sliding shell component 31 is configured with a front sight 314 and a rear sight 315, and the front sight 314 and the rear sight 315 are respectively set at a front end 317 and a rear end 318 of the sliding shell component 31.

Figure 10:
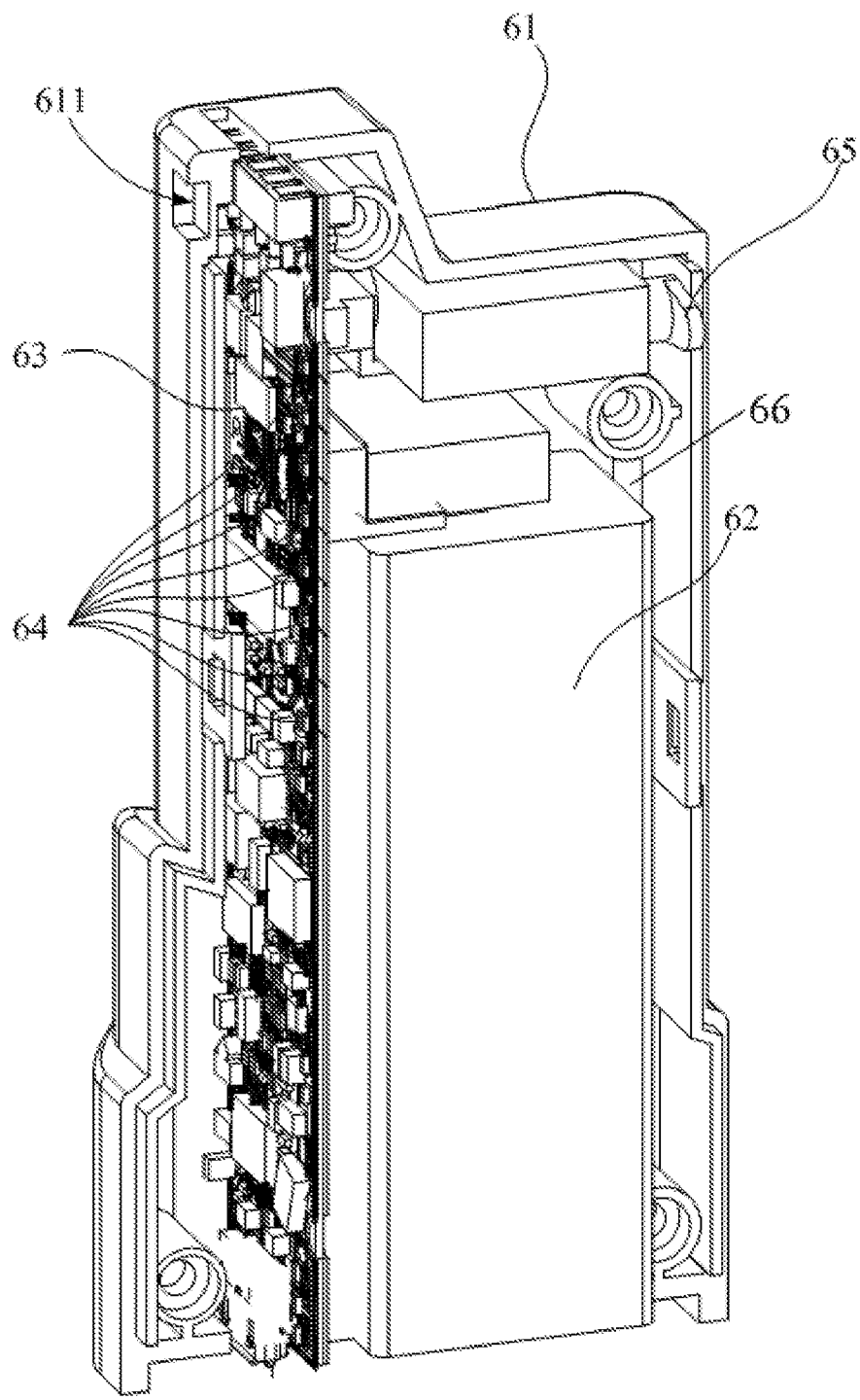
FIG. 10 is a structural schematic view of a charger module in FIG. 1.
Figure 11:
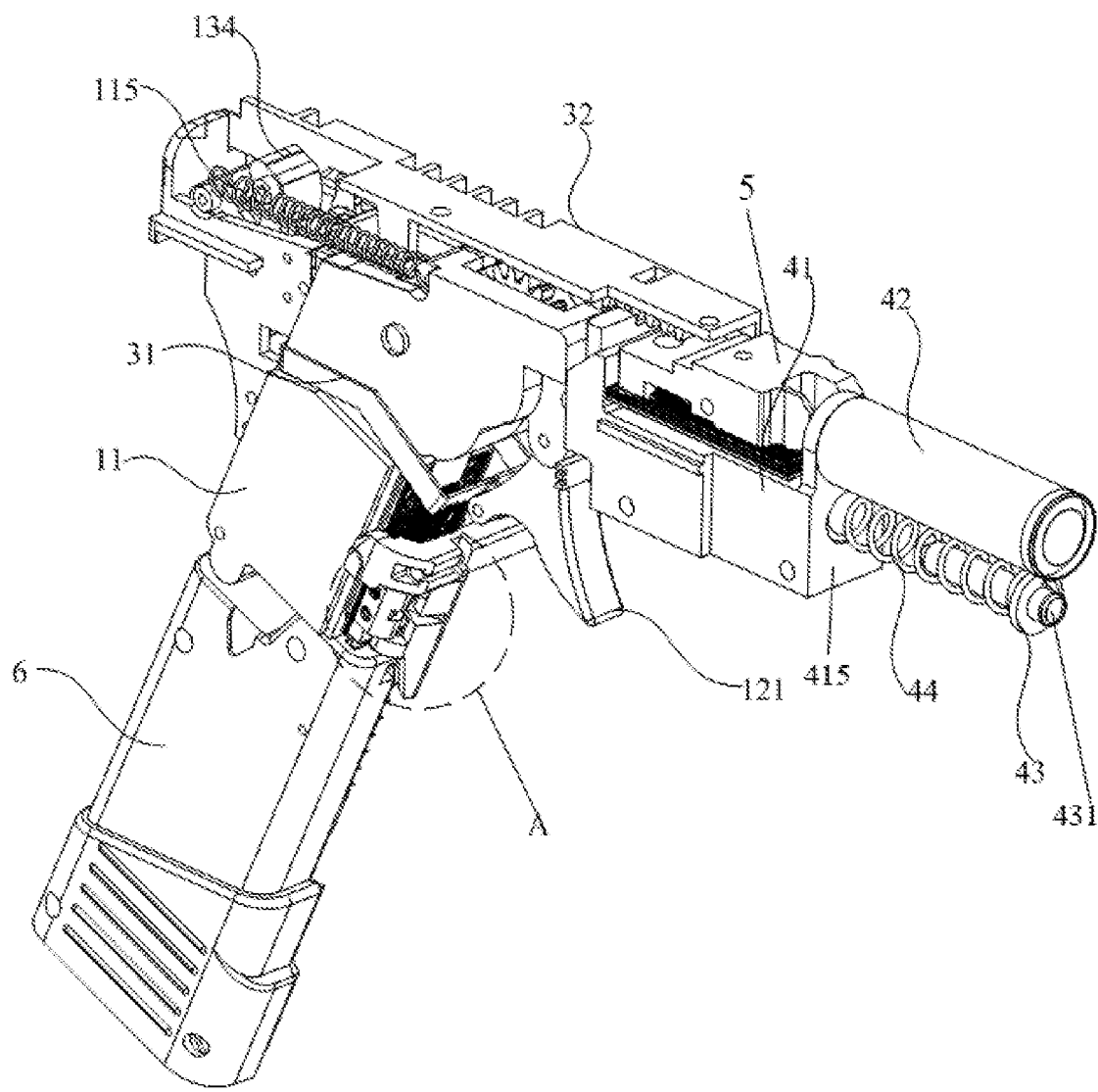
FIG. 11 is a structural schematic view of another part of the imitational laser-shooting simulated gun of FIG. 1.

In one embodiment, according to FIG. 10, the imitational laser-shooting simulated gun D2 further includes a charger module 6, and the charger module 6 includes a charger shell 61 and a battery 62 set in the charger shell 61. The charger shell 61 is partially extended into the outer cover 12 and is detachably connected with the outer cover 12. The battery 62 is electrically connected with the gear box module 2.

In this embodiment, the outer cover 12 is defined with an installation groove (not shown) corresponding to the housing 11. the charger module 6 can be partially extended into the installation groove so that the battery 62 can be electrically connected with the motor 21 of the gear box module 2 through a metal pin. That is, the imitational laser-shooting simulated gun D2 adopts the structure with the detachable charger module 6, so that the charger module 6 is detachable relative to the outer cover 12 and the housing 11, so that the operation of replacing the charger of a gun is simulated, and the simulation effect of the imitational laser-shooting simulated gun D2 is improved.

In one embodiment, according to FIG. 10, the charger module 6 further includes a driving circuit board 63, and the driving circuit board 63 is electrically connected with the battery 62 and the gear box module 2. The driving circuit board 63 is configured with a plurality of LED lamp beads 64, and the LED lamp beads 64 are set to simulate the number of the real bullets so as to facilitate the user to check the number of remaining bullets and simulate the real shooting scene. In particular, the driving circuit board 63 can be electrically connected with the gear box module 2. When the gear box module 2 is triggered once, the driving circuit board 63 records that there is one shot bullet, and a part of the LED lamp beads 64 in the plurality of the LED lamp beads 64 can be adjusted to be extinguished by the driving circuit board 63.

In this embodiment, by adopting the structure provided with the driving circuit board 63, a virtual bullet is installed in the simulated gun charger, and the operation of simulating the loading of the gun is realized through the disassembly and assembly of the charger module 6.

Optionally, the driving circuit board 63 is electrically connected with the circuit board of the gear box module 2 through the metal pins, so that the starting number of the gear box module 2 can be obtained while the motor 21 is powered. In particular, the metal pin is a 6 PIN plug-in module, and the 6 PIN plug-in module is provided with six metal pins.

Optionally, the number of the LED lamp beads 64 can be adjusted according to the model of the actually simulated gun.

In one embodiment, according to FIG. 5, FIG. 10 and FIG. 13, the charger module 6 further includes a steering engine 65. The steering engine 65 is set on one side 66 of the charger shell 61 adjacent to the handle module 1, and the steering engine 65 is electrically connected with the driving circuit board 63.

The sliding shell module 3 is configured with an on-hook clamping groove 316, and the on-hook clamping groove 316 is set adjacent to the housing 11; that is, the on-hook clamping groove 316 is formed on the sliding shell component 31.

The handle module 1 further includes a sliding shell lock 14, a transmission steel wire 15 and a steel wire jacking block 16 which are rotatably configured on the housing 11. One end 151 of the transmission steel wire 15 is connected with the sliding shell lock 14, the other end 152 of the transmission steel wire 15 is connected with the steel wire jacking block 16, and the steel wire jacking block 16 is directly opposite to the steering engine 65.

In this embodiment, the steering engine 65 drives the steel wire jacking block 16 to drive the transmission steel wire 15 and the sliding shell lock 14 to rotate, so that the sliding shell lock 14 can get close to the sliding shell module 3 and is limited by the on-hook clamping groove 316. That is, when the number of bullets recorded by the driving circuit board 63 is zero, the steering engine 65 is adjusted to operate by the driving circuit board 63, a shifting piece of the steering engine 65 rotates to jack up the steel wire jacking block 16, so that the sliding shell lock 14 clamps the on-hook clamping groove 316 on the sliding shell component 31 to inform the user that the charger module 6 needs to be replaced, thus the simulation effect of the imitational laser-shooting simulated gun D2 is improved, and the training effect further improved.

Optionally, the transmission steel wire 15 includes a first section and a second section. The first section and the second section are set to form an included angle therebetween. The first section is set along the vertical direction of the housing 11, and the second section is set along the front-rear direction of the housing 11. The first section is connected with the steel wire jacking block 16, and the second section is connected with the sliding shell lock 14.

In one embodiment, according to FIG. 1, FIG. 11, FIG. 12, FIG. 13, and FIG. 14, the outer cover 12 is defined with two plug-in holes 112 penetrating through the installation groove 111, and the two plug-in holes 112 are oppositely to each other. The handle module 1 further includes a charger lock 17, a charger swing buckle 18, and a swing buckle torsion spring 19. The charger lock 17 is arranged in the two plug-in holes 112 in a penetrating manner. The charger lock 17 is defined with a chute 171. The charger swing buckle 18 is disposed on the inner surface 122 of the outer cover 12 through the swing buckle torsion spring 19. One end of the charger swing buckle 18 is provided with a swing button 181, the swing button 181 being slidably disposed in the chute 171, and the other end of the charger swing buckle 18 is provided with a clamping buckle 182.

Figure 15:
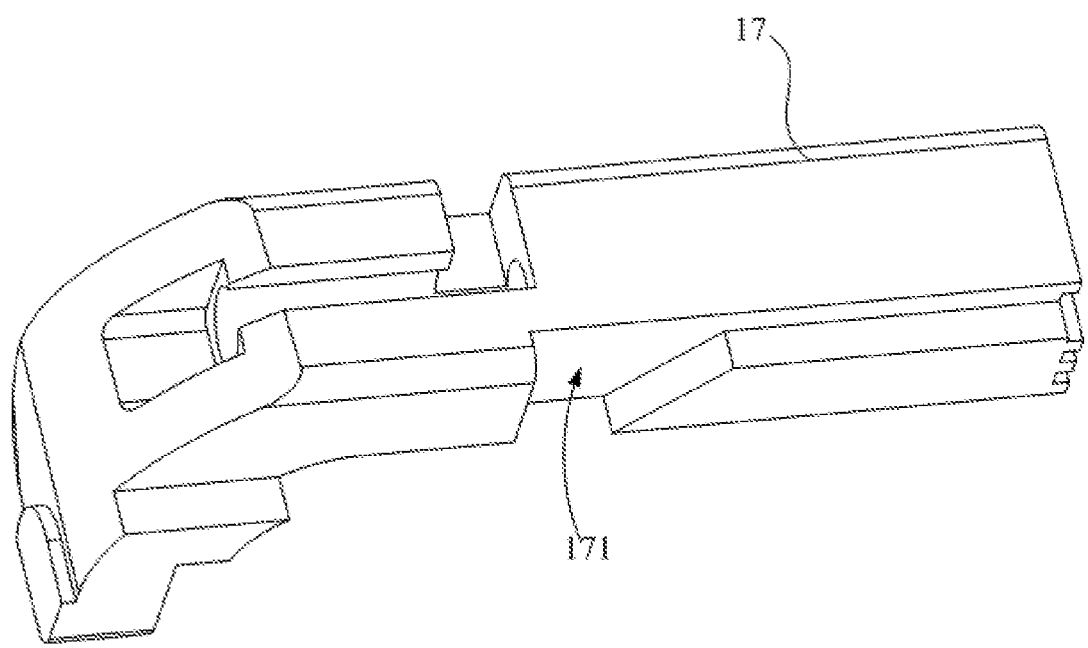
FIG. 15 is the structural schematic view of a charger lock in FIG. 14.
Figure 16:
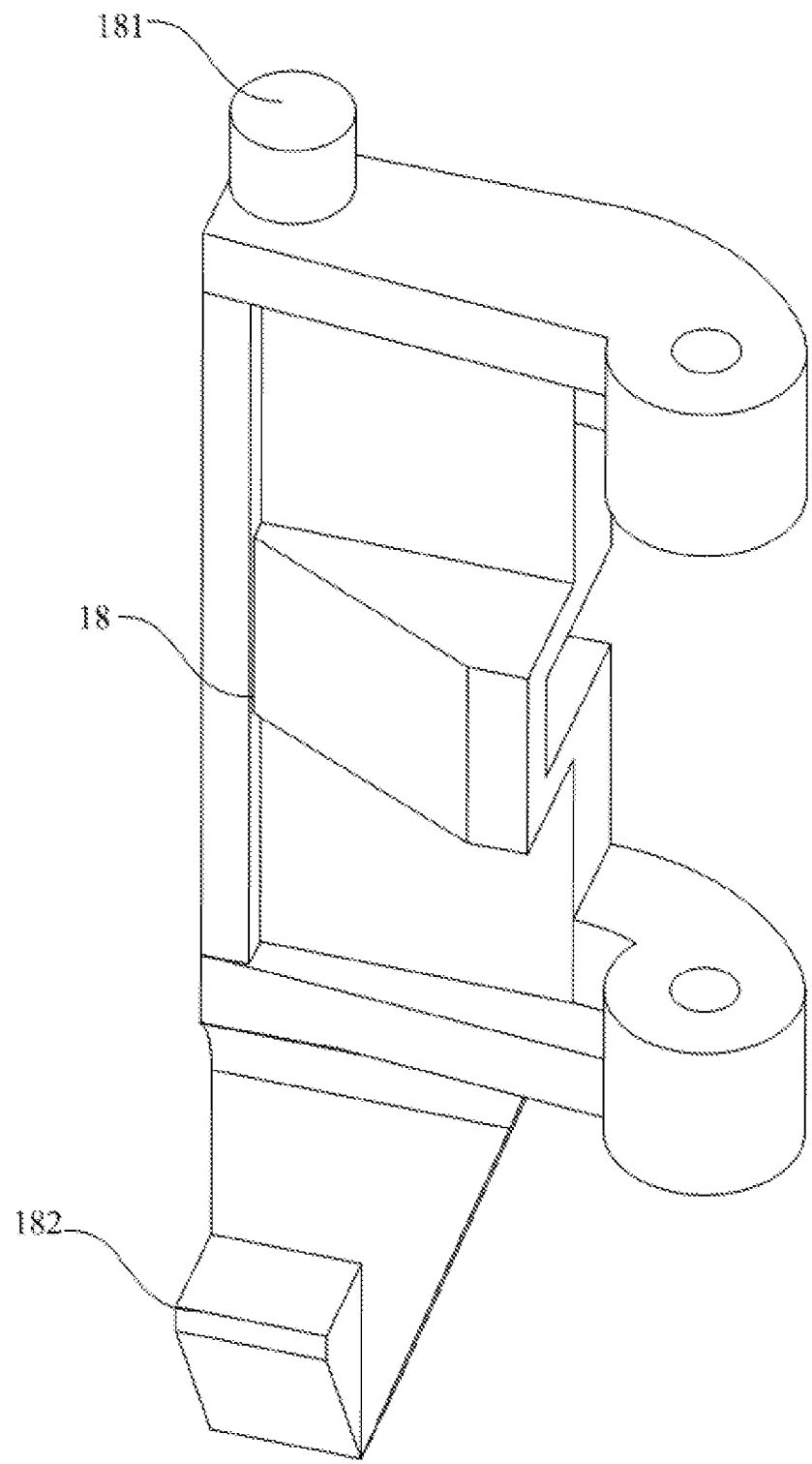
FIG. 16 is the structural schematic view of a charger swing buckle in FIG. 14.

In particular, the mechanism structure of the charger lock 17 is shown in FIG. 15, and the mechanism structure of the swing buckle torsion spring 19 is shown in FIG. 16.

The charger shell 61 is provided with a charger buckle opening 611 corresponding to the clamping buckle 182, as shown in FIG. 14.

Figure 12:
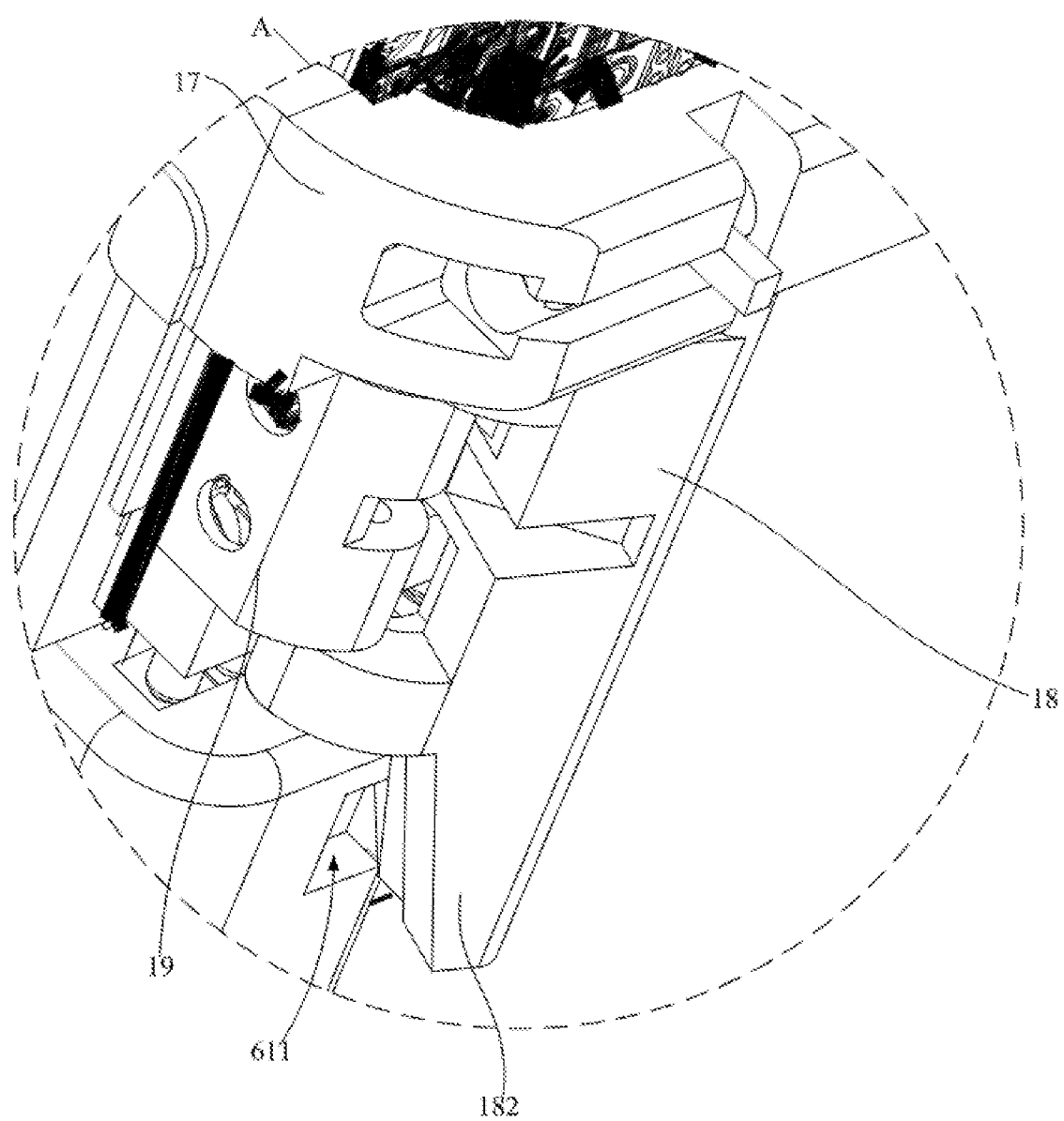
FIG. 12 is an enlarged view of portion A in FIG. 11.

In this embodiment, according to FIG. 12, since the housing 11 is configured with the gear box module 2, the housing 11 occupies a certain space. When the battery 62 is inserted into the outer cover 12, the battery 62 cannot extend to the trigger 121. That is, in the imitational laser-shooting simulated gun D2 of this embodiment of the disclosure, the battery 62 cannot extend to the position corresponding to a thumb of a user. Therefore, the charger swing buckle 18 is adopted to be connected to the charger lock 17, and the swing buckle torsion spring 19 is adopted to be set on the inner wall surface of the outer cover 12.

In this embodiment, according to FIG. 12, the swing buckle torsion spring 19 and the charger buckle 18 are elastically connected with each other through torsion spring, and the swing buckle torsion spring 19 and the charger buckle 18 are arranged on the inner wall surface of the outer cover 12 and adjacent to the charger lock 17. When a user presses the charger lock 17 to move from one side of the outer cover 12 to the other side, the charger buckle 18 is turned over relative to the swing torsion spring 19 to disengage the clamping buckle 182 from the charger buckle opening 611 of the charger shell 61, thus to take out the charger module 6.

Optionally, according to FIG. 14, the direction of one of the plug-in holes 112 to the other of the plug-in holes 112 is defined as the transverse direction. A limiting plug-in is disposed on the charger lock 17. The limiting plug-in is matched with the charger lock 17. A limiting piece is disposed on one side surface of the limiting plug-in. The limiting piece extrudes relative to an axial edge of the charger lock 17 to lock the charger lock 17 on the outer cover 12, so that the charger lock 17 can only make limited lateral movement in the outer cover 12. On the other hand, a return spring is disposed in front of the charger lock 17 and the outer cover 12, one end of the return spring abuts against the limiting plug-in, and the other end of the return spring is connected with the inner wall surface of the outer cover 12, so as to facilitate a reset of the charger lock 17.

Optionally, a plurality of grooves are defined in the surface of one end of the charger lock 17 that is out of one of the plug-in holes 112, and the grooves are arranged side by side or intersect so as to improve a friction coefficient of the surface of the end of the charger lock 17 and facilitate the user to press. The other end of the charger lock 17 is bent to form a limiting step which abuts a periphery of the other of the plug-in holes 112 to prevent the charger lock 17 from disengaging from the outer cover 12.

In one embodiment, the imitational laser-shooting simulated gun D2 may include a plurality of circuit structures. That is, a plurality of circuit structures may include a circuit board corresponding to the gear box module 2, a circuit board corresponding to the Hall sensor 113, a circuit board corresponding to the sensing assembly 114, a circuit board corresponding to the laser module 5, and the driving circuit board 63 of the charger module 6. In particular, the plurality of circuit structures including the circuit board corresponding to the gear box module 2, the circuit board corresponding to the Hall sensor 113, the circuit board corresponding to the sensing assembly 114, and the circuit board corresponding to the laser module 5 can be electrically connected through flexible circuit boards.

Optionally, some of the plurality of circuit boards may also be integrated as a single circuit board.

Figure 17:
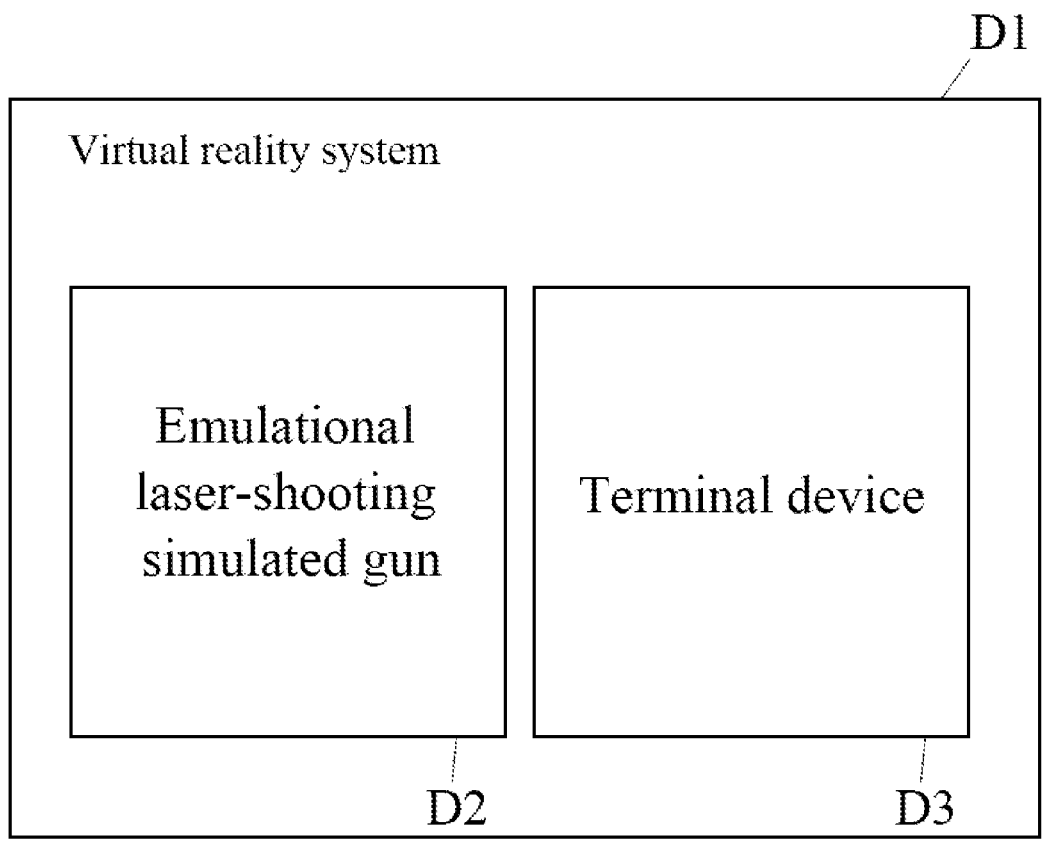
FIG. 17 is a schematic diagram of a virtual reality system according to an embodiment of the present disclosure.

Referring to FIG. 17, the present disclosure also discloses a virtual reality system D1. The virtual reality system D1 includes a terminal device D3 and an imitational laser-shooting simulated gun D2. The specific structure of the imitational laser-shooting simulated gun D2 is described with reference to the above embodiments. Since the virtual reality system D1 adopts any of the technical schemes of the above embodiments, the virtual reality system D1 at least has all the beneficial effects caused by the technical schemes of the above embodiments, and is not repeated here. In particular, the terminal device D3 is connected with the imitational laser-shooting simulated gun D2 by communication.

Optionally, the terminal device D3 is connected with the imitational laser-shooting simulated gun D2 through wireless network connection. In particular, a wireless tranceiving module can be configured on the handle module 1.

In this embodiment, the terminal device D3 may be a personal computer or a server, etc.

The above is only optional embodiments of the disclosure, and does not limit the scope of the patent of the disclosure. All equivalent structural changes made by using the contents of the description and the drawings of the disclosure, or directly/indirectly disclosure in other related technical fields under the inventive concept of the disclosure are included in the scope of patent protection of the disclosure.

What is claimed is:

1. An imitational laser-shooting simulated gun, comprising:
    a handle module comprising a housing, an outer cover and a trigger, wherein the housing is configured with an installation groove, the outer cover covers the housing, the installation groove is set open, and the trigger is rotatably set on the housing and is exposed out of the outer cover, the trigger is configured to generate a triggering signal for shooting;
    a gear box module comprising a motor and a gear set disposed in the installation groove, wherein the motor is connected with the gear set; and
    a sliding shell module slideably connected with the outer cover, covering the installation groove, and engagingly connected with the gear set,
    wherein, the gear box module is configured to drive the sliding shell module to reciprocate on the housing according to the triggering signal, in order to generate a recoil.

2. The imitational laser-shooting simulated gun according to claim 1, wherein, the gear box module further comprises a magnetic member, and the magnetic member is disposed on the gear set;
    the handle module further comprises a Hall sensor, the Hall sensor is disposed on a side of the outer cover facing the housing, the Hall sensor is disposed correspondingly to the gear set, electrically connected to the motor and configured to sense the magnetic member to adjust a rotation of the motor.

3. The imitational laser-shooting simulated gun according to claim 2, wherein, the gear set comprises a primary gear, a crown gear, a secondary gear and a tertiary gear, an output shaft of the motor is engagingly connected with the crown gear through the primary gear, the crown gear, the secondary gear and the tertiary gear are rotatably configured in the installation groove, the crown gear, the secondary gear and the tertiary gear are sequentially engaged, and the tertiary gear is engagingly connected with the sliding shell module;
    the magnetic member is disposed on the tertiary gear and located at a centrifugal position of the tertiary gear;
    the motor is configured to rotate the primary gear, the crown gear, the secondary gear and the tertiary gear, thereby to drive the sliding shell to reciprocate along a length direction of the outer cover.

4. The imitational laser-shooting simulated gun according to claim 3, wherein,
    a periphery of the tertiary gear is configured with a first tooth section and a second tooth section, the first tooth section and the second tooth section are sequentially connected with each other and surround the periphery of the tertiary gear, the tertiary gear further defines a space-avoiding area corresponding to the first tooth section, the space-avoiding area is located side-by-side with the first tooth section;
    the first tooth section and the second tooth section are engagingly connected with the sliding shell module, the second tooth section is further engagingly connected with the secondary gear, and the space-avoiding area is corresponding to the secondary gear.

5. The imitational laser-shooting simulated gun according to claim 1, wherein, the housing comprises a front end and a rear end along a length direction of the housing;
    the handle module further comprises:
    a sensing assembly configured on the rear end of the housing and electrically connected with the gear box module; and
    a transmission assembly movably configured inside the installation groove, spaced from the gear box module, and connected with the trigger,
    wherein, the trigger is further configured to swing to drive the transmission assembly to approach or be away from the sensing assembly, thereby to drive the sensing assembly to generate the triggering signal for shooting.

6. The imitational laser-shooting simulated gun according to claim 5, wherein, the transmission assembly comprises a transmission component, a floating shifting component, a hammer lock, and a hammer movably configured in the installation groove, the transmission assembly is connected with the trigger, and another end of the transmission assembly abuts against the floating shifting component, the floating shifting component abuts against the hammer lock, the hammer lock abuts against a limited position of a periphery of the hammer, the hammer is located on the rear end of the housing;
    the handle module further comprises a tension spring, an end of the tension spring is connected with the hammer, another end of the tension spring is connected with the rear end of the housing, the tension spring is configured to apply a force on the hammer towards the sensing assembly;
    the trigger is configured to swing to drive the transmission component to move, the movement of the transmission component drives the floating shifting component to move, the movement of the floating shifting component drives the hammer lock to rotate, thereby the force on the hammer applied by the hammer lock is canceled.

7. The imitational laser-shooting simulated gun according to claim 6, wherein, the transmission assembly further comprises a floating elastic piece and a hammer locking elastic piece both connected with an inner surface of the installation groove;
    the floating elastic piece abuts against the floating shifting component, and is configured to apply a force on the floating shifting component towards the transmission component;
    the hammer elastic piece abuts against the hammer lock, and applies a force on a periphery of the hammer lock towards the hammer.

8. The imitational laser-shooting simulated gun according to claim 7, wherein, a triggering piece is configured on a side of the hammer facing the sensing assembly;
    the sensing assembly is a photoelectric switch.

9. The imitational laser-shooting simulated gun according to claim 1, wherein, the housing comprises a front end and a rear end along a length direction of the housing; the imitational laser-shooting simulated gun further comprises a blocking module configured on the front end of the housing; the blocking module comprises:

a front rail frame configured at the front end of the housing; and a reciprocating spring reverse pin configured on a side of the front rail frame away form the housing, the reciprocating spring reverse pin abuts against the front rail frame through a reciprocating spring, an end of the reciprocating spring reverse pin away from the reciprocating spring abuts against the sliding shell module, the outer cover is partially covering the blocking module, the sliding shell module is slidably connected to the front rail frame, the sliding shell module defines a reciprocating spring reverse pin hole corresponding to the reciprocating spring reverse pin, a periphery of the reciprocating spring reverse pin hole abuts against the reciprocating spring reverse pin, the reciprocating spring reverse pin and the reciprocating spring are configured to cooperate to apply a force to the sliding shell module towards the front end.

10. The imitational laser-shooting simulated gun according to claim 9, wherein, the sliding shell module further defines a gun hole spaced from the reciprocating spring reverse pin;

the blocking module further comprises a gun barrel, the gun barrel is disposed on a side of the front rail frame away from the housing, the gun barrel is set side-by-side with the reciprocating spring reverse pin, and is set passing through the gun hole.

11. The imitational laser-shooting simulated gun according to claim 10, wherein, the front rail frame comprises:

a frame body connected with the housing, wherein an end of the frame body closer to the housing defines a plug-in hole and a spring groove communicating with the plug-in hole;

a blocking panel received in the plug-in hole, wherein a surface of the blocking panel is convexly formed with a pressure spring blocking sheet corresponding to the spring groove;

a spring set in the spring groove, wherein an end of the spring abuts against a bottom wall of the spring groove, another end of the spring abuts against the pressure spring blocking sheet to urge the blocking panel to partially extrude out of the plug-in hole, the blocking panel abuts against the sliding shell module; and a blocking-and-compressing component fixedly connected to an end of the blocking panel which is out of the plug-in hole, thereby to position the blocking panel at the plug-in hole, wherein the sliding module is slidably connected with the frame body.

12. The imitational laser-shooting simulated gun according to claim 11, wherein, a surface of the blocking panel away from the gun barrel is convexly formed with an anti-disassembling buckle;

the sliding shell module is formed with an anti-tripping buckle corresponding to the anti-disassembling buckle, the anti-tripping buckle abutting against the anti-disassembling buckle.

13. The imitational laser-shooting simulated gun according to claim 10, further comprising a laser module set in the handle module or in the gun barrel, a laser emitting terminal of the laser module being set corresponding to the gun hole.

14. The imitational laser-shooting simulated gun according to claim 10, wherein, the sliding shell module comprises:

a sliding shell component defining a containing groove, the reciprocating spring reverse pin hole and the gun hole that are communicating with the containing groove; and a transmission rack set on a bottom wall of the containing groove;

wherein, the sliding shell component is connected with the handle module, and the transmission rack is engagingly connected with the gear set.

15. The imitational laser-shooting simulated gun according to claim 14, wherein, a front sight and a rear sight are set on an outer surface of the sliding shell component, and the front sight and the rear sight are respectively set on a front end and a rear end of the sliding shell component.

16. The imitational laser-shooting simulated gun according to claim 1, further comprising a charger module, the charger module comprising a charger shell and a battery set in the charger shell, the charger shell being partially inserted in the outer cover, and removably connected with the outer cover, the battery being electrically connected with the gear box module.

17. The imitational laser-shooting simulated gun according to claim 16, wherein, the charger module further comprises a driving circuit board electrically connected with the battery and the gear box module, the driving circuit board is configured with multiple LED lamps, the LED lamps are set to simulate a number of virtual bullets.

18. The imitational laser-shooting simulated gun according to claim 17, wherein, the charger module further comprises a steering engine set on a side of the charger shell closer to the handle module and electrically connected with the driving circuit board;

the sliding module defines an on-hook clamping groove close to the housing;

the handle module further comprises a sliding shell lock, a transmission steel wire and a steel wire jacking block that are rotatably set in the housing, an end of the transmission steel wire is connected with the sliding shell lock, and another end of the transmission steel wire is connected with the steel wire jacking block, the steel wire jacking block directly faces the steering engine;

the steering engine is configured to drive the steel wire jacking block to rotate the transmission steel wire and the sliding shell lock, thereby to make the sliding shell lock get closer to the sliding shell module, and be limitedly positioned in the on-hook clamping groove.

19. The imitational laser-shooting simulated gun according to claim 16, wherein, the outer cover is configured with two plug-in holes communicating with the installation groove, the two plug-in holes are set facing each other;

the handle module further comprises a charger lock, a charger swing buckle and a swing buckle torsional spring, the charger lock is set to run through the two plug-in holes, the charger lock is configured with a chute, the charger swing buckle is set on an inner surface of the outer cover through the swing buckle torsional spring, an end of the charger swing buckle is configured with a swing button slidably set in the chute, and another end of the charger swing buckle is configured with a clamping buckle;

the charger shell is configured with a charger buckle opening corresponding to the clamping buckle.

20. A virtual reality system, comprising:

a terminal device; and the imitational laser-shooting simulated gun of claim 1, wherein, the terminal device is communicating with the imitational laser-shooting simulated gun.

* * * * *